(12) United States Patent
Suehiro et al.

(10) Patent No.: US 8,048,275 B2
(45) Date of Patent: Nov. 1, 2011

(54) METHOD OF SOLUBILIZING CARBON NANOMATERIAL

(75) Inventors: Junya Suehiro, Fukuoka (JP);
Kiminobu Imasaka, Fukuoka (JP)

(73) Assignee: Kyushu University, National University Corporation, Fukuoka (JP)

( * ) Notice: Subject to any disclaimer, the term of this patent is extended or adjusted under 35 U.S.C. 154(b) by 699 days.

(21) Appl. No.: 12/086,302

(22) PCT Filed: Jan. 18, 2007

(86) PCT No.: PCT/JP2007/050649
§ 371 (c)(1),
(2), (4) Date: Jun. 10, 2008

(87) PCT Pub. No.: WO2007/083681
PCT Pub. Date: Jul. 26, 2007

(65) Prior Publication Data
US 2009/0250333 A1    Oct. 8, 2009

(30) Foreign Application Priority Data

Jan. 20, 2006  (JP) ................................. 2006-012400
Aug. 10, 2006  (JP) ................................. 2006-217823

(51) Int. Cl.
*C01B 31/00*   (2006.01)
*C01B 13/00*   (2006.01)
*B01J 19/12*   (2006.01)

(52) U.S. Cl. ............. 204/157.47; 204/157.6; 204/157.5; 204/157.52; 204/157.4; 204/157.15

(58) Field of Classification Search ............. 204/157.42, 204/157.44, 157.47, 157.6, 157.5, 157.52, 204/157.4, 157.15; 205/157; 977/737, 740, 977/745, 748, 786, 847, 963
See application file for complete search history.

(56) References Cited

U.S. PATENT DOCUMENTS 5,648,523 A * 7/1997 Chiang .......................... 977/700
6,491,797 B1 * 12/2002 Locke et al. ............. 204/158.21
7,122,165 B2 * 10/2006 Wong et al. .................... 977/748
(Continued)

FOREIGN PATENT DOCUMENTS

JP    08-012310 A    1/1996
(Continued)

OTHER PUBLICATIONS

Sunka et al, "Generation of chemically active species by electrical discharges in water," Plasma Sources Sci. Technol. 8 (1999), pp. 258-265.*

(Continued)

*Primary Examiner* — Keith Hendricks
*Assistant Examiner* — Colleen M Raphael
(74) *Attorney, Agent, or Firm* — Westerman, Hattori, Daniels & Adrian, LLP

(57) ABSTRACT

[Problems] The present invention is to provide a method of solubilizing a carbon nanomaterial, in which a carbon nanomaterial can be dissolved in a hydrophilic solvent easily and uniformly without structural deterioration of the carbon nanomaterial, the dispersibility can be maintained for a prolonged period of time, the solubilizing treatment can be performed at low cost, and the treatment can be easily controlled.
[Means for Resolution] The method of solubilizing a carbon nanomaterial of the invention is characterized by mixing a carbon nanomaterial in a hydrophilic solvent, and performing streamer discharge in the hydrophilic solvent to dissolve the carbon nanomaterial in the hydrophilic solvent with the dispersed state thereof maintained stably.

9 Claims, 23 Drawing Sheets

U.S. PATENT DOCUMENTS

| | | | | |
|---|---|---|---|---|
| 7,276,283 | B2* | 10/2007 | Denes et al. | 977/847 |
| 7,553,471 | B2* | 6/2009 | Ohashi et al. | 977/847 |
| 7,666,382 | B2* | 2/2010 | Ghenciu et al. | 977/746 |
| 2005/0136079 | A1* | 6/2005 | Burangulov et al. | 424/401 |
| 2006/0058443 | A1* | 3/2006 | Ohashi et al. | 524/496 |
| 2006/0060464 | A1* | 3/2006 | Chang | 422/186 |
| 2009/0288442 | A1* | 11/2009 | Arai et al. | 204/157.15 |

FOREIGN PATENT DOCUMENTS

| | | |
|---|---|---|
| JP | 2001-104771 A | 4/2001 |
| JP | 2001-252665 A | 9/2001 |
| JP | 2003-300715 A | 10/2003 |
| JP | 2005-119930 A | 5/2005 |
| JP | 2005-213108 A | 8/2005 |

OTHER PUBLICATIONS

Clements et al, "Preliminary Investigation of Prebreakdown Phenomena and Chemical Reactions Using a Pulsed High-Voltage Discharge in Water," IEEE Trans. Ind. Appl., 1A-23, No. 2, Mar./Apr. 1987, pp. 224-235.*

Sun et al, "Optical study of active species produced by a pulsed streamer corona discharge in water," J. Electrostat. 39 (1997), pp. 189-202.*

Locke et al, "Electrohydraulic Discharge and Nonthermal Plasma for Water Treatment," Ind. Eng., Chem. Res. 2006, 45, pp. 882-905.*

Chen et al, "Plasma Activation of Carbon Nanotubes for Chemical Modification," J. Phys. Chem. B 2001, vol. 105, pp. 618-622.*

International Search Report of PCT/JP2007/050649 date of mailing Mar. 13, 2007.

Noriaki Sano et al.; "Pressure effects on nanotubes formation using the submerged arc in water method"; Chemical Physics Letters, vol. 378, No. 1-2, pp. 29-34, 2003.

Yusuke Kanetake et al.; "Dispersion of multi-walled carbon nanotubes by pulsed streamer discharge in the suspension of carbon nanotubes"; Denki Gakkai Hoden Kenkyukai Shiryo, vol. ED-06, No. 1-19, pp. 1-6, 2006.

Kiminobu Imasaka et al.; "Preparation of water-soluble carbon nanotubes using a pulsed streamer discharge in water"; Nanotechnology vol. 17, pp. 3421-3427, 2006.

Bing Sun et al.; "Optical study of active species produced by a pulsed streamer corona discharge in water"; Journal of Electrostatics, vol. 39, pp. 189-202; 1997.

Kiminobu Imasaka et al.; "Solubilization of Carbon Nanotubes Using Microplasma Treatment in Water (3) Efficiency Improvement by O2 Gas Bubbling"; Dai 67 Kai Extended Abstracts, The Japan Society of Applied Physics, p. 459, [30p-D-3], 2006.

Yuki Kato et al.; "The effectiveness of gas bubbling in water solubilization of carbon nanotubes by pulsed streamer discharge in water"; Annual Conference of Fundamentals and Materials Society IEE Japan, vol. 2006, p. 539, 2006.

B. Sun et al.; "Non-uniform pulse discharge induced radical production in distilled water"; Journal of Electrostatics, vol. 43, pp. 115-126, 1998.

H. Akiyama; "Streamer Discharges in Liquids and their Applications"; IEEE Transactions on Dielectrics and Electrical Insulation, vol. 7, No. 5, pp. 646-653, 2000.

J. Suehiro et al.; "Production of Carbon Nanoparticles Using Pulsed Arc Discharge Triggered by Dielectric Breakdown in Water"; Japan Journal of Applied Physics, vol. 42, pp. L1483-L1485, 2003.

"Experimental Results"; IEEEJ, p. 3.

* cited by examiner

FIG. 4A
FIG. 4B
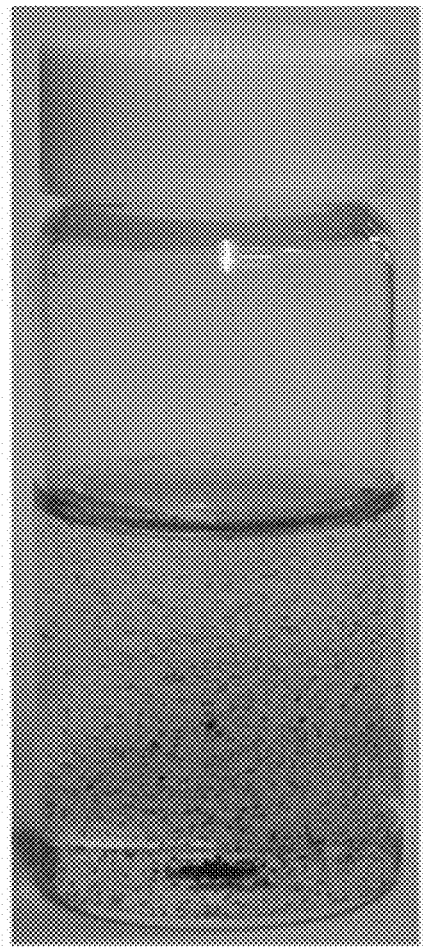
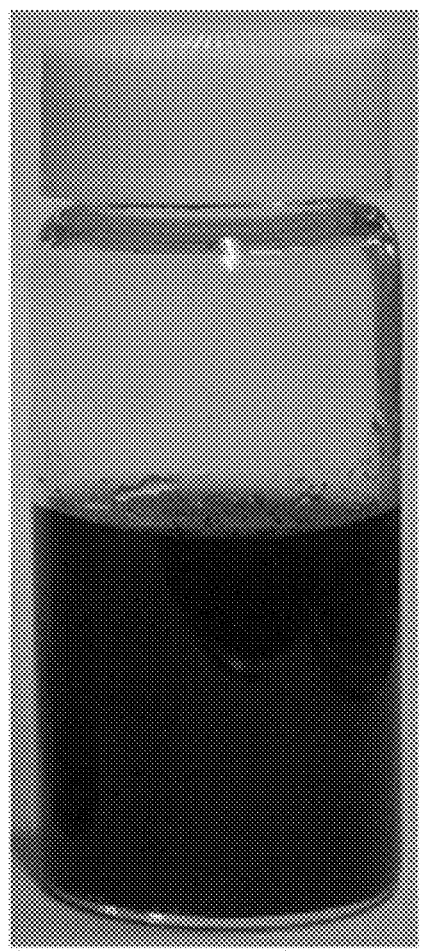

FIG. 13A
WITH BUBBLING
FIG. 13B
WITHOUT BUBBLING
FIG. 13C
BEFORE TREATMENT
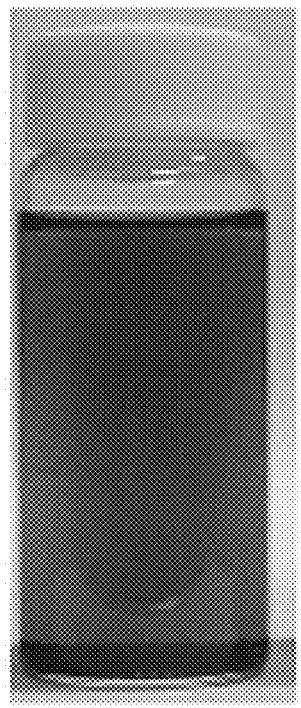
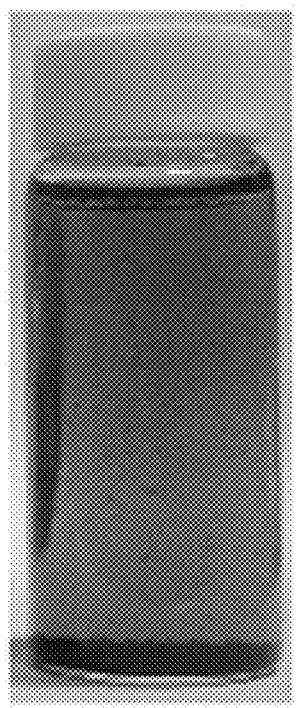
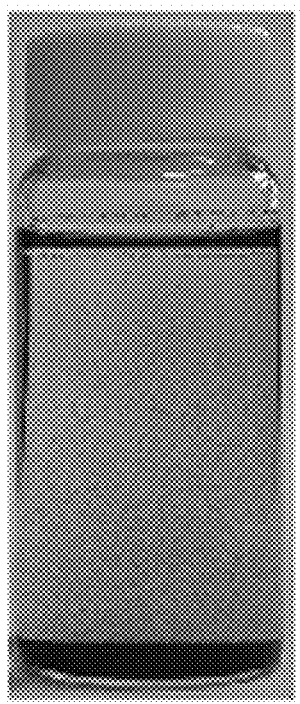

WITH BUBBLING

WITHOUT BUBBLING

AFTER TREATMENT

BEFORE TREATMENT

METHOD OF SOLUBILIZING CARBON NANOMATERIAL

TECHNICAL FIELD

The present invention relates to a method of solubilizing a carbon nanomaterial, in which a carbon nanomaterial, such as carbon nanotubes (hereinafter, referred to as CNT), fullerenes and the like, in a hydrophilic solvent, such as water, an alcohol and the like.

BACKGROUND ART

In recent years, the nanotechnology is being developed quickly. In particular, CNT is receiving attention owing to the excellent characteristics thereof. Specifically, CNT is excellent in electric characteristics, mechanical strength and the like, and is greatly expected as a filler constituting a composite material with a resin, an organic semiconductor or the like, with unlimited future applications to electronic devices, electrochemistry and the like. CNT has a size (diameter) of several nanometers and thus is increasingly expected as a material, such as a probe and the like, as transporting means for a medical component, such as an anticancer agent, an antiviral agent and the like, into the living body in the medical and pharmaceutical fields, and as a compositional component for cosmetics. Fullerenes, such as C60, C70 and the like, carbon nanohorns and carbon nanocapsules are in the same situations. The CNT, fullerenes and carbon nanocapsules referred herein encompasses, in addition to pure carbon clusters, carbon clusters that partly have heteroatoms substituted or heteroatoms intercalated.

However, CNT, carbon nanohorns, fullerenes and the like are difficulty soluble in a hydrophilic solvent, such as water, an organic solvent (e.g., an alcohol, acetic acid and the like) and the like, in spite of the excellent characteristics thereof. Among CNT, single wall carbon nanotubes (SWCNT) exhibit higher insolubility than multi-wall carbon nanotubes (MWCNT). Single wall carbon nanohorns (SWCNH) are in the same situations. Owing to the nature thereof, the carbon nanomaterial is prevented from being spread practically in contrast with the great expectation thereof.

A hydrophilic solvent, such as water and the like, easily dissolves a polar solute having high hydrophilicity owing to the high hydrophilicity thereof, but the carbon nanomaterial, such as CNT, fullerenes and the like, is difficulty dissolved therein due to the non-polarity (hydrophobicity) thereof. Accordingly, such methods have been practiced as a chemical bonding method of subjecting CNT or fullerenes to surface modification by effecting a chemical treatment, such as an acid treatment and the like, to forma carboxyl group on the surface, and a physical adsorption method of physically adsorbing a solubilizing agent, such as a surfactant and the like, on the surface of CNT or fullerenes for solubilization (for example, Patent Documents 1 and 2). In the physical adsorption method, ultrasonic vibration or the like is often applied for accelerating solubilization, after addition of the solubilizing agent. The physical adsorption method has such characteristics in that CNT suffers less structural defects formed on the surface thereof, in contrast with the chemical bonding method. The hydrophilic solvent referred herein means a solvent having a hydrophilic group and having a high dielectric constant.

Apart from the solubilizing treatment, the inventors have proposed an underwater high voltage pulsed arc discharge method as an effective production method of carbon nanoparticles (Non-patent Document 1). The inventors have found in the studies that carbon nanoparticles produced by the production method of Non-patent Document 1 are formed in a state where the carbon nanoparticles are uniformly dispersed in water.

In the production method reported in Non-patent Document 1, which is a revolutionary method that attains simultaneously both production and solubilization of carbon nanoparticles by performing pulsed arc discharge in water, however, the dispersion herein occurs incidentally upon producing the carbon nanotubes, and thus the method is not a universal solubilizing method capable of dissolving a carbon material produced by an arbitrary production method in a hydrophilic solvent. Furthermore, the high voltage pulsed arc discharge method utilized in herein is basically adapted for a treatment in a gas state since thermal plasma is used, and thus an apparatus therefor is not simple due to high energy necessarily used.

The term "solubilization" referred in the specification means that hydrophilic nature is applied to a hydrophobic solute that is difficultly soluble in a hydrophilic solvent, and the solute is dispersed in the solvent owing to the nature. Accordingly, the term "solubilization" referred in the specification does not mean a state without turbidity corresponding to emulsification, but is equivalent to a combination of a solubilizing treatment and a dispersing treatment (which generally forms turbidity) of an insoluble solute.

Such a dispersion method has been proposed in that multi-wall CNT is subjected to a plasma treatment in a gas state by utilizing low temperature plasma (nonequilibrium plasma) of oxygen, nitrogen or the like, which is different from the use of thermal plasma such as pulsed arc discharge in Non-patent Document 1, so as to obtain an acidic functional group content of 2% or more per carbon on the surface thereof, and thus is dispersed in a liquid with ultrasonic wave or the like (for example, Patent Document 3). The equipment for discharging in the method is simple owing to the use of low temperature plasma, as compared to the high voltage pulsed arc discharge method.

Patent Document 3 discloses such an assumption in that multi-wall CNT can be dispersed since the multi-wall CNT has an acidic functional group on the surface thereof, and the acidic functional group repulses an acidic functional group on another multi-wall CNT adjacent thereto to ravel out the tangled multi-wall CNT, which is thus dispersed. However, the operation, in which multi-wall CNT is subjected to a plasma treatment in a specific gas atmosphere to obtain an acidic functional group content of 2% or more, and then further subjected to a physical dispersing treatment in a liquid, such as ultrasonic wave, high-speed agitation and the like, involves increase in number of process steps due to the treatments in gas and liquid, which brings about complex treatments, prolonged process time, and use of bloated equipments, whereby complication in control and management induces increase in cost.

The conventional plasma treatment for surface modification of CNT utilizes discharge in a gas atmosphere, but discharge occurs not only in a gas atmosphere but also in water. This has been reported by the inventors in the production method of carbon nanoparticles in Non-patent Document 1.

It has been reported that radicals, such as an OH radical, an H radical, an O radical, an $H_2O_2$ radical and the like, and ozone $O_3$ are generated upon performing pulsed streamer discharge in water (for example, Non-patent Documents 2 and 3). It has also been reported that the discharge plasma radiates a strong ultraviolet ray corresponding to about 30% of the energy of the plasma to activate the area along the channel of discharge, and $H_2O_2$ generated is decomposed to an OH radical with the ultraviolet ray (Non-patent Document 2). However, the pulsed streamer discharge reported in Non-patent Documents 2 and 3 is for generating radicals in water to process microorganisms or harmful chemical substances in water with the action of the radicals thus activated, but has no relationship to the problem of changing the insolubility, which is one of the physical natures of a carbon nanomaterial in a hydrophilic solvent, to a soluble nature, and resolution means therefor (i.e., a method of solubilizing a carbon nanomaterial for dissolving in a hydrophilic solvent). Examples of the case utilizing underwater streamer discharge for cleaning water as similar to the above include a wastewater processing equipment (for example, Patent Document 4).

It has been reported that in the case where gas is bubbled upon performing pulsed streamer discharge in water, a chemical action is directly applied in addition to the physical action, so as to generate radicals (Non-patent Document 4). According to Non-patent Document 4, in the case where the gas bubbled is oxygen, a certain amount of an OH radical is generated, and in the case of argon, the amounts of an H radical and an O radical are large, but the amount of an OH radical is small. However, Non-patent Document 4 does not suggest a solubilizing method of dissolving a carbon nanomaterial in a hydrophilic solvent, as similar to Non-patent Documents 2 and 3. Consequently, it is still unknown what type of contribution is made by streamer discharge in a solvent to solubilization of a carbon nanomaterial.

Patent Document 1: JP-A-8-12310
Patent Document 2: JP-A-2001-104771
Patent Document 3: JP-A-2003-300715
Patent Document 4: JP-A-2001-252665
Non-patent Document 1: J. Suehiro, K. Imasaka, Y. Ohshiro, G. Zhou, M. Hara, N. Sano, "Production of carbon nanoparticles using pulsed arc discharge triggered by dielectric breakdown in water", Japan Journal Applied Physics, vol. 42, pp. 1483-1485 (2003)
Non-patent Document 2: B. Sun, M. Sato, J. S. Clements, "Non-uniform pulse discharge-induced radical production in distilled water", Journal Electronics, vol. 43, pp. 115-126 (1998)
Non-patent Document 3: H. Akiyama, "Streamer discharge in liquid and their applications", IEEE Trans. Electr. Insl., vol. 39, pp. 646-652 (2000)
Non-patent Document 4: B. Sun, M. Sato, J. S. Clements, "Optical study of active species produced by a pulsed streamer corona discharge in water", Journal Electronics, vol. 39, pp. 189-202 (1997)

Problems to be Solved by the Invention

As having been described, a carbon nanomaterial, such as CNT, carbon nanohorns, fullerenes and the like, has such a nature in that it is insoluble in a hydrophilic solvent. Therefore, a chemical bonding method and a physical adsorption method using a surfactant are performed. However, the chemical bonding method damages the structure of the carbon nanomaterial to bring about deterioration in structure of the carbon nanomaterial, and the physical adsorption method requires a delicate process, such as control of the concentration of the solubilizing agent or the like, whereby it is difficult to control the process stably due to many instability factors.

The inventors have found that carbon nanoparticles produced by high voltage pulsed arc discharge in water are uniformly dispersed in water, but the dispersion phenomenon occurs in the course of production of carbon nanoparticles and cannot solubilize a carbon nanomaterial by another production method in a hydrophilic solvent, and the method cannot further improve the dispersibility of the particles obtained by high voltage pulsed arc discharge and thus cannot be determined as such a versatile dispersing method that is optimum for long-term storage of a carbon material produced by other various methods.

In the dispersing method of Patent Document 3, multi-wall CNT is subjected to a plasma treatment in a gas state to control the ratio of the acidic functional group and then dispersed in a liquid, whereby the process requires a prolonged period of time and high cost, and the process is difficult to control. The pulsed streamer discharge in water reported in Non-patent Document 3 and Patent Document 4 utilizes OH radicals for processing microorganisms or harmful chemical substances in water, but has no relationship to a solubilizing method of a carbon nanomaterial.

Non-patent Document 4 discloses that in the case where gas is bubbled upon performing pulsed streamer discharge in water, a chemical action is directly applied in addition to the physical action, so as to generate radicals. However, this is only for processing microorganisms or harmful chemical substances by action of the activated radicals, and does not suggest the problem of solubilizing an insoluble carbon nanomaterial and a method therefor. In summary, Patent Documents 1 to 4 and Non-patent Documents 1 to 4 fail to disclose such a problem in that a carbon nanomaterial is changed in only one nature, i.e., the insoluble nature, to a soluble nature without change in structure thereof (i.e., without structural deterioration), and resolution means therefor.

It is considered that a carbon nanomaterial is applied to various fields including an electronic device, electrochemistry and the like in future and is greatly expected as transporting means for transporting medical agents and medical components in the medical and pharmaceutical fields and transporting a compositional component to the living body in the field of daily commodities, such as cosmetics and the like. The solubilizing technique of a carbon nanomaterial is necessary in these technical fields, and a technique capable of solubilizing a carbon nanomaterial in a hydrophilic solvent easily and uniformly is demanded.

Under the circumstances, an object of the invention is to provide such a method of solubilizing a carbon nanomaterial in that a carbon nanomaterial can be easily and uniformly dissolved in a hydrophilic solvent without structural deterioration thereof, the dispersibility can be maintained stably for a prolonged period of time, and the solubilizing treatment can be performed at low cost and can be easily controlled.

Means for Solving the Problems

The method of solubilizing a carbon nanomaterial of the invention is characterized by comprising: mixing a carbon nanomaterial in a hydrophilic solvent; performing streamer discharge repeatedly in the hydrophilic solvent to form in the solvent radicals derived from the solvent capable of bonding OH groups on a surface of the carbon nanomaterial; making the carbon nanomaterial hydrophilic with the radicals to solubilize in the solvent; and dispersing the carbon nanomaterial in the hydrophilic solvent stably.

Advantage of the Invention

According to the method of solubilizing a carbon nanomaterial of the invention, a carbon nanomaterial can be dissolved in a hydrophilic solvent easily and uniformly without structural deterioration thereof, and the dispersibility thereof can be maintained stably for a prolonged period of time, whereby the solubilizing treatment can be performed at low cost and can be easily controlled.

BEST MODE FOR CARRYING OUT THE INVENTION

A first embodiment of the invention is a method of solubilizing a carbon nanomaterial characterized by comprising: mixing a carbon nanomaterial in a hydrophilic solvent; performing streamer discharge repeatedly in the hydrophilic solvent to form in the solvent radicals derived from the solvent capable of bonding OH groups on a surface of the carbon nanomaterial; making the carbon nanomaterial hydrophilic with the radicals to solubilize in the solvent; and dispersing the carbon nanomaterial in the hydrophilic solvent stably. Accordingly, the carbon nanomaterial can be dissolved in a hydrophilic solvent easily and uniformly without structural deterioration thereof, and the dispersibility thereof can be maintained stably for a prolonged period of time, whereby the solubilizing treatment can be performed at low cost and can be easily controlled.

A second embodiment of the invention is an embodiment depending on the first embodiment, characterized in that the streamer discharge is pulsed streamer discharge. Accordingly, a considerably simple equipment can be used for the treatment, whereby the carbon nanomaterial can be easily solubilized in the hydrophilic solvent, and the dispersibility thereof can be maintained stably for a prolonged period of time.

A third embodiment of the invention is an embodiment depending on the first or second embodiment, characterized in that the streamer discharge forms mainly an H radical and an O radical in the hydrophilic solvent, and forms OH groups on the carbon nanomaterial in the hydrophilic solvent. Accordingly, the carbon nanomaterial can be dissolved in a hydrophilic solvent easily and uniformly without structural deterioration thereof, and the dispersibility thereof can be maintained stably for a prolonged period of time.

A fourth embodiment of the invention is an embodiment depending on the first or second embodiment, characterized in that the streamer discharge forms mainly an OH radical in the hydrophilic solvent, and forms OH groups on the carbon nanomaterial in the hydrophilic solvent. Accordingly, the carbon nanomaterial can be dissolved in a hydrophilic solvent easily and uniformly without structural deterioration thereof, and the dispersibility thereof can be maintained stably for a prolonged period of time.

A fifth embodiment of the invention is an embodiment depending on the first or second embodiment, characterized in that during the discharge, a shock wave and/or an ultrasonic wave is applied to the carbon nanomaterial in the hydrophilic solvent as a physical force that is generated by the discharge or an external action. Accordingly, the carbon nanomaterial can be quickly dissolved in the hydrophilic solvent by the synergistic effect of the radical and the physical force.

A sixth embodiment of the invention is an embodiment depending on the first or second embodiment, characterized in that the carbon nanomaterial is one of multi-wall carbon nanotubes, single wall carbon nanotubes, a fullerene and carbon nanocapsules. Accordingly, various kinds of carbon nanomaterials can be solubilized and applied to various purposes.

A seventh embodiment of the invention is an embodiment depending on the first or second embodiment, characterized in that the streamer discharge is performed by applying a pulse voltage with a pulse width of 1 μs or less at a prescribed frequency to electrodes. Accordingly, radicals are formed in the hydrophilic solvent to dissolve the carbon nanomaterial in a hydrophilic solvent easily and uniformly without structural deterioration thereof, and the dispersibility thereof can be maintained stably for a prolonged period of time, whereby the solubilizing treatment can be performed at low cost and can be easily controlled.

An eighth embodiment of the invention is a method of solubilizing a carbon nanomaterial characterized by comprising: mixing a carbon nanomaterial in a hydrophilic solvent; performing streamer discharge repeatedly in the hydrophilic solvent while bubbling gas in the hydrophilic solvent to form in the solvent radicals derived from the solvent capable of bonding OH groups on a surface of the carbon nanomaterial; making the carbon nanomaterial hydrophilic with the radicals to solubilize in the solvent; and dispersing the carbon nanomaterial in the hydrophilic solvent stably. Accordingly, since the streamer discharge is performed while bubbling gas in the suspension liquid, an insoluble carbon nanomaterial, such as single wall carbon nanotubes, single wall carbon nanohorns and the like, can be easily solubilized in a hydrophilic solvent, and the dispersibility of the carbon nanomaterial can be maintained stably for a prolonged period of time. Furthermore, the carbon nanomaterial can be solubilized without structural deterioration thereof, and only the dispersibility thereof can be improved.

A ninth embodiment of the invention is an embodiment depending on the eighth embodiment, characterized in that the gas is one of oxygen, ozone and an inert gas. Accordingly, an insoluble carbon nanomaterial, such as SWCNT, SWCNH and the like, can be easily solubilized in a hydrophilic solvent, and the dispersibility of the carbon nanomaterial can be maintained stably for a prolonged period of time.

A tenth embodiment of the invention is a method of solubilizing a carbon nanomaterial characterized by comprising: mixing a carbon nanomaterial in a hydrophilic solvent having hydrogen peroxide or ozone dissolved therein; performing streamer discharge repeatedly in the hydrophilic solvent to form in the solvent radicals derived from the solvent capable of bonding OH groups on a surface of the carbon nanomaterial; making the carbon nanomaterial hydrophilic with the radicals to solubilize in the solvent; and dispersing the carbon nanomaterial in the hydrophilic solvent stably. Accordingly, an insoluble carbon nanomaterial, such as single wall carbon nanotubes, single wall carbon nanohorns and the like, can be easily solubilized in a hydrophilic solvent, and the dispersibility of the carbon nanomaterial can be maintained stably for a prolonged period of time. Furthermore, the carbon nanomaterial can be solubilized without structural deterioration thereof, and only the dispersibility thereof can be improved.

EXAMPLES

Example 1

The method for solubilizing a carbon nanomaterial according to Example 1 of the invention will be described. In the specification, the term "carbon nanomaterial" is used since CNT, carbon nanohorns, fullerenes, carbon nanocapsules and the like are used as a target, but a material in a micron-size but not in a nano-size may be included in some cases. Accordingly, the carbon nanomaterial includes these cases. Although Example 1 describes the case where multi-wall carbon nanotubes (MWCNT) as an example of the carbon nanomaterial are solubilized, the same can be applied to single wall carbon nanotubes (SWCNT), fullerenes, carbon nanocapsules and the like, and the following description is not limited to multi-wall carbon nanotubes. The methods of accelerating solubilization of SWCNT and single wall carbon nanohorns will be described in detail in Examples 2 and 3.

FIG. 1 is an explanatory diagram showing a solubilizing apparatus in Example 1 of the invention, FIG. 2 is a photograph showing optical emission on pulsed streamer discharge in the invention, FIG. 3 is an explanatory diagram showing the waveforms of the output voltage and current of pulsed streamer discharge in Example 1 of the invention, FIG. 4(a) is a photograph showing a suspension liquid before subjecting to the pulsed streamer discharge treatment in Example 1 of the invention, FIG. 4(b) is a photograph showing a suspension liquid after subjecting to the pulsed streamer discharge treatment in Example 1 of the invention, FIG. 5(a) is an explanatory diagram showing the transmittance before and after the pulsed streamer discharge treatment and that in the case where an ultrasonic dispersion treatment is performed, FIG. 5(b) is an enlarged view of a part of FIG. 5(a) surrounded with the chain line, FIG. 6(a) is an SEM photograph showing multi-wall carbon nanotubes before subjecting to the pulsed streamer discharge treatment in Example 1 of the invention, FIG. 6(b) is an SEM photograph showing multi-wall carbon nanotubes after subjecting to the pulsed streamer discharge treatment in Example 1 of the invention, FIG. 7 is an explanatory diagram showing the FTIR measurement results of the multi-wall carbon nanotubes before and after the pulsed streamer discharge treatment in Example 1 of the invention, FIG. 8 is a diagram showing measurement of an optical emission spectrum from the pulsed streamer discharge in Example 1 of the invention, FIG. 9(a) is an explanatory view showing dispersion of the multi-wall carbon nanotubes after subjecting to the pulsed streamer discharge treatment in Example 1 of the invention, FIG. 9(b) is an enlarged explanatory view showing the multi-wall carbon nanotubes in FIG. 9(a), and FIG. 10 is a diagram showing Raman spectral measurement of the multi-wall carbon nanotubes after subjecting to the pulsed streamer discharge treatment in Example 1 of the invention.

In FIG. 1, numeral 1 denotes a suspension liquid containing a hydrophilic solvent, such as water, ethanol, methanol and the like, having mixed therein a carbon nanomaterial, such as CNT, fullerenes, carbon nanocapsules and the like, and in Example 1, containing water having mixed therein multi-wall carbon nanotubes (hereinafter, referred to as MWCNT), and 2 denotes a discharge chamber, such as a discharge tube and the like, capable of housing the suspension liquid 1 and of performing discharge therein. In the case where the suspension liquid 1 is not agitated before the pulsed streamer discharge treatment, the MWCNT is precipitated in a short period of time to separate the suspension liquid into two layers.

The MWCNT mixed in the suspension liquid 1 preferably has high purity. In Example 1, 25 mg of MWCNT having a purity of 95% was suspended in 100 mL of deionized water to form a suspension liquid 1 of 250 µg/mL, about 10 mL of which was housed in the discharge chamber 2, and a needle-plate electrode pair described later was immersed in the suspension liquid 1 for measurement. The method for improving the purity of the MWCNT is not limited as far as the method does not impair the discharge treatment performed later.

Numeral 3 denotes a needle electrode constituting the needle-plate electrode pair for performing pulsed streamer discharge, and 4 denotes a plate electrode disposed to face the needle electrode 3. The needle electrode 3 has a minute sphere body at the tip thereof, which is made of tungsten and has a curvature radius of about 0.3 mm in Example 1. The plate electrode 4 is a circular plate made of stainless steel having a diameter of 10 mm, and a gap length g of 10 mm is provided between the needle electrode 3 and the plate electrode 4. The gap length g is preferably about from 5 mm to 50 mm. When the gap length g is too short, the discharge transfers to arc discharge, and when it is too large, streamer discharge does not occur. Accordingly, for generating streamer discharge for forming intended radicals, a suitable gap length g may be selected from the range of from 5 mm to 50 mm in consideration of the extent of voltage and the pulse width. Upon applying a high voltage between the needle-plate electrode pair, pulsed streamer discharge is generated between the needle electrode 3 and the plate electrode 4. In Example 1, pulsed streamer discharge is performed with the combination of the needle electrode 3 and the plate electrode 4 facing the same, and a thin wire electrode may also be preferably used in addition thereto since it is sufficient that a high electric field region is formed in water for generating pulsed streamer discharge.

Numeral 5 denotes a direct current power source capable of changing the voltage, 6 denotes a pulse generating unit, and 7 denotes a gap switch equipped with a spark gap. One end of the direct current power source 5 is grounded, and the other end thereof is connected to the pulse generating unit 6 for applying a negative voltage. The polarity of the voltage may be positive, but the conditions for generating pulsed streamer discharge stably (such as the amplitude, the pulse width of the voltage, and the like) may vary depending on the polarity of the voltage. In this point of view, application of a negative voltage is superior for generating radicals. The pulse generating unit 6 for pulsed streamer discharge is preferably one utilizing a Blumlein transmission line type pulse generating circuit, and the circuit is expressed as an equivalent circuit containing plural stages, each of which has characteristics of a capacitance C and an inductance L per unit length, distributed in the line direction. The pulse generating unit 6 in Example 1 performs pulsed streamer discharge with the Blumlein transmission line type pulse generating circuit, and the pulse generating unit 6 can bond OH groups to the surface of the carbon nanomaterial in the solvent, i.e., radicals particular for attaining hydrophilicity are formed from the solvent, and OH groups can be bonded to the carbon nanomaterial with the direct action of the radicals or a reaction process of the radicals. The streamer discharge may be performed repeatedly until the aggregated bodies of CNT are raveled out to bundle units of individual CNT (which may be referred to as fibrous CNT), and the pulse generating unit is not limited to one utilizing the Blumlein transmission line type pulse generating circuit.

In Example 1, a coaxial cable having a length of 30 m and a characteristic impedance $(L/C)^{1/2}$ of 55Ω was used for constituting the Blumlein transmission line type pulse generating circuit. Upon operating the gap switch 7, voltage waves are formed in the respective stages and then overlapped and dispersed to output a pulse voltage having a rectangular wave on the load side of the Blumlein transmission line type pulse generating circuit. At this time, the polarity of the pulse voltage generated is opposite to the polarity of the voltage generated by the direct current power unit 5. That is, in Example 1, the polarity of the streamer discharge is the positive polarity. The rectangular wave at this time has a pulse width τ of $2l(LC)^{1/2}$, wherein l represents the length of the coaxial cable and corresponds to the number of stages of the equivalent circuit. Accordingly, the pulse width τ can be controlled by changing the length of the coaxial cable, and the generating rate of the radicals can be controlled by controlling the pulse width τ.

In the solubilizing apparatus shown in FIG. 1, symbol $R_1$ denotes a charging resistance of 5 MΩ, and $R_2$ denotes a resistance of 150Ω provided for impedance matching. In the solubilizing apparatus shown in FIG. 1, the direct current power source 5 was −40 kV, the spark gap was 13 mm, and the repetition frequency was 15 Hz (pps). In this case, the theoretical pulse width τ is 329 ns.

Numeral 8 denotes a voltage measuring unit using a high voltage probe for measuring the output voltage, and 9 denotes a current measuring unit using a Rogowski coil or the like for measuring the output current of the pulsed streamer discharge. Numeral 10 denotes a controlling unit for controlling the voltage of the direct current power unit 5 and the repetition frequency of the pulsed streamer discharge based on the measurement results of the voltage measuring unit 8 and the current measuring unit 9. Numeral 11 denotes a timing unit for measuring the time where the pulsed streamer discharge is continued, and 12 denotes a counter for counting the repetition frequency.

The operation of the solubilizing apparatus of Example 1 will be described below. Upon turning on a switch, which is not shown in the figures, the controlling unit 10 increases the voltage of the direct current power source 5 to a prescribed value, and a negative voltage is applied to the pulse generating unit 6 from the direct current power unit 5. The capacitor units of the respective stages of the Blumlein transmission line type pulse generating circuit are charged, and upon turning on the gap switch 7, voltage waves for discharge are formed in the respective stages and then overlapped and dispersed to output a high pulse voltage to the load side of the plate electrode, thereby generating pulsed streamer discharge.

The pulsed streamer discharge forms plasma in water (partially associated with gasification), and the plasma is different from thermal plasma (i.e., plasma where all the electron temperature, the ion temperature and the molecule temperature are high) generated by arc discharge, but is nonequilibrium plasma where only the electron temperature is high. Accordingly, in Example 1, activation can be attained to generate $O_3$ and radicals capable of bonding OH groups on the surface of the carbon nanomaterial, such as H, OH, $H_2O_2$ and the like, where the water temperature remains ordinary temperature. The same situation is applied to other hydrophilic solvents, such as an alcohol, although the generation amount thereof varies. The nonequilibrium plasma can form radicals, which are difficult to be obtained with thermal plasma. For generating pulsed streamer discharge that generates radicals changing the insolubility of CNT to a soluble nature, a high pulse voltage having a pulse rise time of from several tens to several hundreds nanoseconds and a pulse width as a pulse height value of from 10 ns to 1 μs may be applied to the electrodes. The upper limit and the lower limit of the pulse width are determined based on the following factors. There is unavoidable time delay between the applied voltage reaching the prescribed value and generation of streamer discharge. Thus, it is the minimum condition necessary for discharge that the pulse width is longer than the time delay. In the case where the pulse width is too large, on the other hand, streamer discharge transfers to arc discharge, which brings about melting of the electrode metal and contamination of the carbon nanomaterial caused thereby. It is significantly important that the pulse width is the prescribed value, i.e., 1 μs, or less, for changing the insolubility to a soluble nature without influence on the carbon nanomaterial. The repetition frequency is preferably selected from 1 Hz (pps) to 100 Hz (pps) for improving the soluble nature by generating radicals. The radicals are similarly generated on using a hydrophilic solvent other than water, such as ethanol, methanol and the like. The discharge time is at least 1 minute, hopefully from 10 minutes to 1 hour, and preferably any more.

FIG. 2 is a photograph showing optical emission on the pulsed streamer discharge, and FIG. 3 shows the waveforms of the output voltage and current of the pulsed streamer discharge in Example 1. According to FIG. 3, the pulse width of the solubilizing apparatus of Example 1 is 353 ns, which well agrees with the theoretical value, 329 ns. After rising and during the pulse voltage is applied, the output current is increased in proportion to time. Accordingly, it is understood that pulsed streamer discharge is generated during the period of 200 ns where the current is being increased. In Example 1, the pulsed streamer discharge is preformed with the constant pulse width, but the discharge is not limited to this type of pulsed streamer discharge since radicals can be formed in water by performing streamer discharge repeatedly.

The dispersibility of the suspension liquid obtained by performing pulsed streamer discharge in water will be then described. The suspension liquid obtained by performing pulsed streamer discharge for 5 hours with the solubilizing apparatus of Example 1 was subjected to transmitted light intensity measurement and SEM observation for evaluating dispersibility. A He—Ne laser (aperture: about 4 mm) was used for measuring the transmitted light intensity. A real surface view micrometer (Model VE-7800, produced by Keyence Corp.) was used for the SEM observation. The observation was carried out after the suspension liquid having been subjected to the pulsed streamer discharge was dropped on cover glass, followed by drying. For investigating the factors of solubilization, absorption spectrum of the suspension liquid subjected to the pulsed streamer discharge was measured, and also the optical emission spectrum of the pulsed streamer discharge was measured. A Fourier transform infrared spectrophotometer (FTIR) (Model FT/IR-620, produced by JASCO Corp.) was used for measuring the absorption spectrum, and a spectrometer (Model USR-40V, produced by Ushio, Inc.) was used for measuring the optical emission spectrum. For investigating as to whether or not the pulsed streamer discharge exerts influence on the structure of the MWCNT, water is evaporated from the suspension liquid, and then the crystallinity thereof was evaluated with a laser Raman spectrophotometer (Model NRS-2000, produced by JASCO Corp.).

FIGS. 4(a) and (b) show the states of the suspension liquid before and after performing the pulsed streamer discharge treatment. In the suspension liquid before subjecting to the pulsed streamer discharge treatment, the MWCNT is precipitated to form a transparent aqueous solution as a supernatant as shown in FIG. 4(a) in a short time after agitation. Upon performing the pulsed streamer discharge in the suspension liquid for 5 hours, on the other hand, the color of the solvent gradually becomes black with the lapse of time, and the suspension liquid becomes entirely turbid. The suspension liquid maintains the dispersibility as shown in FIG. 4(b) even after 5 days from completion of the pulsed streamer discharge. While not shown in the figures, the dispersibility is maintained after lapsing 1 month or more. It can be said from the results that the pulsed streamer discharge is effective for solubilizing CNT, and in other words, such a nature is imparted to CNT. According to the factors described later, not only CNT, but also other carbon nanomaterials than CNT, such as fullerenes, carbon nanocapsules and the like, can be solubilized in a hydrophilic solvent and can be maintained in a stable dispersed state in the solvent for a prolonged period of time.

The results of the measurement of the transmitted light intensity of the suspension liquid will be described. In FIG. 1, He—Ne laser was radiated on the side wall of the discharge chamber 2 having light transmittancy to measure the intensity of the transmitted light for measuring the light transmittance. FIGS. 5(a) and (b) show the light transmittance the suspension liquid of the three cases, i.e., before and after performing the pulsed streamer discharge treatment, and for comparison to them, in the case where an ultrasonic dispersion treatment (500 W, 5 hours) is performed.

It is understood that the suspension liquid before subjecting to the pulsed streamer discharge treatment is significantly low in dispersibility of the MWCNT (not dissolved) since the transmittance is always 100% from the initial stage of the measurement. The suspension liquid subjected to the ultrasonic dispersion treatment has a transmittance reaching about 100% within about 3 minutes to form a transparent supernatant as shown in FIG. 5(b). On the other hand, the suspension liquid after subjecting to the pulsed streamer discharge treatment maintains a transmittance of 5% or less even after lapsing 1 week from the initial stage of the measurement to maintain the dispersibility of the aqueous solution. While not shown in FIGS. 5(a) and (b), in the manner as described above with respect to FIG. 4(b), the suspension liquid of the MWCNT after subjecting to the pulsed streamer discharge treatment maintains the stable dispersibility in water at room temperature even after lapsing 1 month or more from completion of the pulsed streamer discharge.

Accordingly, it is understood from the measurement of transmitted light intensity that the pulsed streamer discharge solubilizes a carbon nanomaterial in a hydrophilic solvent and disperses the same in the solvent for a prolonged period of time.

The results of SEM observation of the MWCNT in the suspension liquid before and after the pulsed streamer discharge treatment will be described. FIGS. 6(a) and (b) are the SEM observation results of the suspension liquid before and after the pulsed streamer discharge treatment. The SEM images are taken after evaporating the water content of the MWCNT suspension liquid. FIG. 6(a) shows the suspension liquid before the pulsed streamer discharge treatment, in which aggregated particles in a spherical form caused by failure of uniform dispersion in the solvent are observed. The upper right-hand photograph is an enlarged view of the particle, which shows an aggregated body of the MWCNT in a spherical form having an average particle diameter of about 20 μm. Only the aggregated bodies of the MWCNT were observed in the suspension liquid as a whole, and the MWCNT in a fiber form (which is substantially in a bundle unit) in a dispersed state was not observed.

After performing the pulsed streamer discharge treatment, on the other hand, the MWCNT in a fiber form is substantially uniformly dispersed entirely as shown in FIG. 6(b). The aggregated bodies shown in FIG. 6(a) are substantially not present in the aqueous solution after subjecting to the discharge treatment, and the MWCNT is dispersed uniformly in the state shown in FIG. 6(b). Accordingly, the pulsed streamer discharge ravels out the MWCNT stabilized as aggregated body, whereby the MWCNT in a fiber form is stabilized in water, and is dispersed substantially uniformly in the aqueous solution.

As having been described, according to the solubilizing method of a carbon nanomaterial of Example 1, the MWCNT is stably dispersed in water with pulsed streamer discharge, and the factors enabling the solubilization will be described below. It is considered that the largest factor of the pulsed streamer discharge contributing to the solubilization is that OH groups are bonded to the MWCNT by the pulsed streamer discharge treatment. FIG. 7 shows the FTIR measurement results of the suspension liquid of the MWCNT before and after the pulsed streamer discharge treatment. According to FIG. 7, spectral absorption occurs in a region of from 3,200 $cm^{-1}$ to 3,500 $cm^{-1}$ only after subjecting to the pulsed streamer discharge treatment.

It has been known that the region is an absorption spectrum of O—H stretching vibration, and the fact that absorption occurs in the region means that OH groups, which are not present before the pulsed streamer discharge treatment, are bonded to the MWCNT by the pulsed streamer discharge. The state is shown in FIG. 9(b). As shown in FIG. 9(b), it is considered that numerous OH groups, which are compatible with the hydrophilic groups (OH groups) of the hydrophilic solvent, are formed on a part of the MWCNT, which is inherently nonpolar (hydrophobic), whereby the MWCNT can be present stably in water and thus is solubilized. In other words, a hydrophilic solvent, such as water, an organic solvent (e.g., an alcohol, acetic acid and the like), and the like, has high hydrophilicity, and thus does not dissolve a nonpolar solute but easily dissolves a polar solute having high hydrophilicity, and it is considered that the nonpolar MWCNT is bonded with OH groups by the pulsed streamer discharge and thus is solubilized.

The following reaction can be considered as a mechanism of bonding OH groups to the MWCNT. In the optical emission spectrum in FIG. 8, the peaks of an Hα radical (656 nm) and an O radical (777 nm) are clearly detected under the conditions (including the pulse voltage, the pulse width, the repetition frequency, the discharge time and the like) of Example 1. Accordingly, it is considered that an O radical generated by the discharge firstly oxidizes the surface of the MWCNT to induce surface modification of the MWCNT, and subsequently, an H radical generated by the discharge is reacted with the O radical adsorbed on the surface of the MWCNT to form an OH group.

Furthermore, although not clearly detected in the measurement shown in FIG. 8, it has been known that pulsed streamer discharge in water generates OH radicals (309 nm) as described for Non-patent Document 3. Accordingly, OH radicals can be formed in addition to H radicals and O radicals, or OH radicals can be mainly generated, by changing the discharge conditions from those in Example 1, and the OH radicals can be bonded to the MWCNT to form OH groups.

As the second factor of the pulsed streamer discharge contributing to the solubilization, the presence of a physical force, such as a shock wave, an ultrasonic wave and the like, generated by the pulsed streamer discharge is considered. Upon visually observing the optical emission image shown in FIG. 2, such a phenomenon, whose state is described in FIG. 9(a), can be visually confirmed in that the aggregated MWCNT is pulverized into fine aggregated bodies with a shock wave, an ultrasonic wave or the like. Not only the action of the pulsed streamer discharge (induced by the discharge) is applied, but also it is preferred to apply a physical force (pulverizing force) with an external action (induced externally).

According to Example 1, the radicals, such as an H radical, an O radical, an OH radical and the like, are formed in the hydrophilic solvent by the pulsed streamer discharge and are bonded to the carbon nanomaterial, whereby the carbon clusters are made hydrophilic and thus are dissolved in the hydrophilic solvent, and the aggregated bodies of the tangled carbon nanomaterial are raveled out with a physical force, such as a shock wave, an ultrasonic wave and the like, generated simultaneously with the formation of radicals. Accordingly, the carbon nanomaterial can be stably solubilized in the hydrophilic solvent.

Finally, the influence of the pulsed streamer discharge on the carbon nanomaterial will be described. The influence of the discharge on the carbon nanomaterial in Example 1 was measured by Raman spectrometry. FIG. 10 shows results of Raman spectrometry of the MWCNT. According to FIG. 10, two peaks that are characteristic to CNT appear both before and after performing the pulsed streamer discharge treatment. The first peak is the D band of amorphous carbon around 1,350 cm$^{-1}$. The second peak is the G band derived from graphite around 1,590 cm$^{-1}$. The quality of crystallinity of the CNT can be evaluated by the height ratio G/D of the D band and the G band. In general, a larger G/D ratio means a substance having better crystallinity.

The G/D ratio of the MWCNT before the pulsed streamer discharge obtained based on the measurement result on the upper side of FIG. 10 was 0.7, and the G/D ratio after the pulsed streamer discharge obtained based on the measurement result on the lower side was 0.8. Thus, the G/D ratios before and after the pulsed streamer discharge were the substantially same values. This means that no structural deterioration occurs in the MWCNT by the pulsed streamer discharge, and it is understood that the pulsed streamer discharge realizes solubilization and improves only the dispersibility without inducing structural deterioration of the MWCNT.

As having been described, the solubilizing method of Example 1 utilizes streamer discharge in a suspension liquid and thus easily realizes solubilization of a carbon nanomaterial in a hydrophilic solvent. The dispersibility of the carbon nanomaterial obtained by the method is stably maintained for a prolonged period of time. The streamer discharge induces no structural deterioration of the carbon nanomaterial, but realizes solubilization and improves only the dispersibility.

The solubilizing method of a carbon nanomaterial of Example 1 can uniformly dissolve a carbon nanomaterial in a hydrophilic solvent with a solubilizing apparatus that is simple as compared to an apparatus for performing high-voltage pulsed arc discharge or an apparatus for performing streamer discharge in gas and a dispersion treatment separately, whereby the solubilizing treatment can be performed at low cost, and the treatment can be easily controlled.

Furthermore, in the case where pulsed streamer discharge is used as the streamer discharge, which can be performed with a considerably simple apparatus, a carbon nanomaterial can be easily and certainly dissolved in a hydrophilic solvent, and the dispersibility can be stably maintained for a prolonged period of time.

Example 2

The method for solubilizing a carbon nanomaterial according to Example 2 of the invention will be described. Example 2 describes the case where single wall carbon nanotubes (hereinafter referred to as SWCNT) and single wall carbon nanohorns (hereinafter referred to as SWCNH), which are stronger than multi-wall carbon nanotubes (MWCNT) in a slightly soluble property, are solubilized. However, the method can be applied to not only SWCNT and SWCNH, but also carbon nanomaterials in general, such as MWCNT and the like.

FIG. 11 is an explanatory diagram showing a solubilizing apparatus in Example 2 of the invention, FIG. 12 is a photograph showing optical emission on pulsed streamer discharge in Example 2 of the invention, FIG. 13(a) is a photograph showing a suspension liquid after subjecting to the pulsed streamer discharge treatment with oxygen gas bubbling in Example 2 of the invention, FIG. 13(b) is a photograph showing a suspension liquid after subjecting to the pulsed streamer discharge treatment without bubbling in Example 2 of the invention, FIG. 13(c) is a photograph showing a suspension liquid before subjecting to the pulsed streamer discharge treatment in Example 2 of the invention, FIG. 14 is an explanatory diagram showing spectral distributions of the absorbance in the presence and absence of bubbling in Example 2 of the invention, FIG. 15(a) is an explanatory diagram showing the absorbance of the SWCNT suspension liquid compared for the presence and absence of bubbling in Example 2 of the invention, FIG. 15(b) is an explanatory diagram showing the absorbance of the SWCNH suspension liquid compared for the presence and absence of bubbling in Example 2 of the invention, FIG. 16 is a diagram showing the time-lapse change of the absorbance of the SWCNT suspension liquid after subjecting to the underwater streamer discharge treatment in Example 2 of the invention, FIG. 17 is a diagram showing the particle diameter distribution of the SWCNT suspension liquid subjected to the streamer discharge treatment with oxygen gas bubbling in Example 2 of the invention, and FIG. 18 is a diagram showing the optical emission spectral distribution during the pulsed streamer discharge of the single wall nanotube suspension liquid in Example 2 of the invention.

FIG. 19(a) is a photograph showing a single wall carbon nanotube suspension liquid after subjecting to the pulsed streamer discharge treatment with argon gas bubbling in Example 2 of the invention, FIG. 19(b) is a photograph showing a single wall carbon nanotube suspension liquid after subjecting to the pulsed streamer discharge treatment without bubbling in Example 2 of the invention, FIG. 20 is a diagram showing comparison in influence on the absorbance of the SWCNT suspension liquid upon performing gas bubbling in Example 2 of the invention, FIG. 21(a) is a photograph showing a SWCNT suspension liquid after subjecting to the underwater streamer discharge treatment without gas bubbling, FIG. 21(b) is a photograph showing the state after performing the discharge treatment with nitrogen gas bubbling, FIG. 21(c) is a photograph showing the state after performing the discharge treatment with argon gas bubbling, FIG. 22(a) is a diagram showing comparison in normalized optical emission intensity of Hα in the cases where gas bubbling of oxygen, nitrogen and argon is performed, and FIG. 22(b) is a diagram showing comparison in normalized optical emission intensity of O radicals in the cases where gas bubbling of oxygen, nitrogen and argon is performed.

The solubilizing apparatus of Example 2 of the invention basically includes the similar structures as in the solubilizing apparatus of Example 1. Accordingly, the same symbols as in Example 1 are attached to the similar structures, and the descriptions thereof are omitted and referred to Example 1.

In FIG. 11, numeral 3a denotes a wire electrode made of tungsten for performing pulsed streamer discharge, and 4 denotes a plate electrode disposed to face the wire electrode 3a. The wire electrode 3a has a diameter of 60 μm. The plate electrode 4 is a rectangular plate made of stainless steel having a dimension of 28 mm×58 mm, and a gap length g of 13 mm is provided between the wire electrode 3a and the plate electrode 4. The gap length g is preferably about from 5 mm to 50 mm because of the same reasons as described above. Upon applying a high voltage between the wire-plate electrode pair, pulsed streamer discharge is generated at plural positions of the wire electrode 3a between the wire electrode 3a and the plate electrode 4. The discharge chamber 2 in Example 2 is a box vessel having a dimension of 60 mm (width)×30 mm (depth)×30 mm (height).

The constitution of Example 2 will be further described. Numeral 13 denotes a gas ejection path for introducing oxygen or an inert gas to the liquid in the discharge chamber 2 for bubbling therein, 14 denotes a flow control valve provided on the gas ejection path 13, and 15 denotes a stirrer. FIG. 12 shows the state of pulsed streamer discharge generated between the wire and plate electrode pair. The direct current power source 5, the pulse generating unit 6, the gap switch 7, the voltage measuring unit 8 for measuring the output voltage, the current measuring unit 9 for measuring the output current, the timing unit 11 and the counter 12 shown in FIG. 11 are basically the same as in Example 1, and descriptions therefor are omitted herein.

The method of solubilizing SWCNT will be described. SWCNT is mixed in a hydrophilic solvent, which is water in Example 2, in the discharge chamber 2, and the controlling unit 10 is operated. The controlling unit 10 opens the flow control valve 14 and feeds bubbling gas, such as oxygen, at a constant flow rate and ejects the gas in the liquid. The controlling unit 10 operates the stirrer 15 to agitate the suspension liquid 1 to make the distribution of bubbles and the SWCNT uniform. Thereafter, a high voltage is applied between the wire and plate electrode pair and the pulsed streamer discharge is performed during the predetermined time to solubilize the carbon nanomaterial. In this case, as similar to Example 1, a high pulse voltage having a pulse rise time of from several tens to several hundreds nanoseconds and a pulse width of hopefully about from 10 ns to 1 μs is applied to the electrodes at a frequency of from 1 Hz to 100 Hz for generating pulsed streamer discharge that generates radicals changing the insolubility of CNT to a soluble nature. The discharge treatment is performed for at least 1 minute, hopefully from 10 minutes to 1 hour, and preferably any more.

The function where the bubbling gas is ejected will be described. The bubbling gas is oxygen. In the state where the pulsed streamer discharge has not been performed, the suspension liquid is in the state shown in FIG. 13(c), and the SWCNT is substantially not dissolved. Upon performing the pulsed streamer discharge thereon, however, the SWCNT is dissolved as shown in FIG. 13(b). This is because of the mechanisms as described for Example 1. The suspension liquid 1 in this case is entirely turbid, and it can be understood that the SWCNT is dissolved. The experiment is conducted in such conditions that the amount of water in the discharge chamber 2 is 50 mL, the amount of the SMCNT mixed therein is 5 mg/50 mL, the gas flow rate is 100 mL/min, and the treating time (discharging time) is 10 minutes. Since the SEM photograph of the SMCNT before the pulsed streamer discharge is substantially the same as FIG. 6(a), and the SEM photograph of the SMCNT after the pulsed streamer discharge is substantially the same as FIG. 6(b), the photographs are not again cited herein. Reference should be made to FIGS. 6(a) and (b).

On the other hand, the result in the case where the pulsed streamer discharge is performed with oxygen bubbling is shown in FIG. 13 (a). The gas flow rate is 100 mL/min, and the treating time (discharge time) is 10 minutes. The suspension liquid 1 in this case is turbid significantly strongly as compared to the suspension liquid 1 in FIG. 13 (b) and is entirely colored to a dark color (blackish gray). This shows that the SWCNT is better dissolved than the case using only discharge and is uniformly dispersed in the liquid. The experiment was performed under the aforementioned conditions, and the same results were obtained when the flow rate was changed to from 100 mL/min to 500 mL/min. It is considered that the same result may be obtained when the bubbling is performed with a flow rate exceeding 500 mL/min.

For quantitatively evaluating the effect of gas bubbling, the suspension liquid is irradiated with ultraviolet to visible light and compared for absorbance upon performing the pulsed streamer discharge in the presence and absence of bubbling. FIG. 14 shows relationship between the presence and absence of bubbling upon performing the pulsed streamer discharge and the spectral distributions of the SWCNT absorbance. According thereto, the maximum absorbance appears at 256 nm irrespective of the presence and absence of bubbling. The suspension concentration is 10 μg/mL in both the cases. FIG. 15(a) shows comparison demonstrating influence of the presence and absence of bubbling on solubilization of SWCNT in water by the pulsed streamer discharge with the maximum absorbance at 256 nm as an index. FIG. 15(b) shows the results obtained by performing the same evaluation on a SWCNH suspension liquid having a suspension concentration of 50 μg/mL.

FIG. 15(a) shows comparison in absorbance of the SWCNT suspension liquid having a suspension concentration of 10 μg/mL in the presence and absence of bubbling. According thereto, the absorbance with oxygen bubbling is larger 1.5 times or more than that without bubbling. This shows that the suspension liquid of SWCNT with oxygen bubbling is more turbid. Similarly, FIG. 15(b) shows comparison in absorbance of the SWCNH suspension liquid having a suspension concentration of 50 μg/mL in the presence and absence of bubbling. According thereto, the absorbance with oxygen bubbling is larger about 2 times than that without bubbling. This shows that the suspension liquid of SWCNH with oxygen bubbling is more turbid drastically. While not shown in FIGS. 15(a) and (b), the suspension liquid of SWCNT maintained the dispersibility in water of room temperature stably after lapsing 1 month (31 days) from completion of the pulsed streamer discharge. Similarly, it was confirmed that the suspension liquid of SWCNH maintained the dispersibility in water of room temperature stably until 26th day. The experiments were completed since it was sufficiently confirmed that both the suspension liquids were stable. Accordingly, the pulsed streamer discharge can solubilize a single wall carbon nanomaterial, such as SWCNT, SWCNH and the like, in a hydrophilic solvent and can disperse the same in the solvent for a prolonged period of time.

An experiment was further performed with the constitution shown in FIG. 11 with measurement conditions changed. Specifically, a wire having a diameter of 60 μm was used as the wire electrode 3a, a rectangular stainless steel plate of 15 mm×40 mm was used as the plate electrode 4 grounded, and the gap length g was 12 mm. Pulsed streamer discharge was performed in the apparatus with bubbling oxygen gas for an hour in 60 mL of suspension liquid having a suspension concentration of 100 μg/mL containing SWCNT having a length of from 2 μm to 5 μm, a diameter of from 1 nm to 2 nm (bundle diameter of 15 nm) and a purity of from 50% to 70% (519308-250MG, produced by Aldrich, Inc.). The results obtained are shown in FIG. 16. FIG. 16 shows the time-lapse change of the absorbance of the SWCNT suspension liquid after subjecting to the underwater streamer discharge treatment. According thereto, the absorbance peak is gradually decreased within several days from completion of the discharge treatment irrespective of the presence and absence of oxygen bubbling, and thus it is understood that a part of the SWCNT solubilized in water is slightly reaggregated. However, both the suspension liquids are maintained at a substantially constant absorbance after the 10th day. Thus, the solubilization can be maintained for a prolonged period of time owing to the function of the pulsed streamer discharge. The reduction rate in absorbance within the period of 10 days is about 15% for the case where oxygen bubbling is performed or about 40% for the case without oxygen bubbling, and thus it is understood that the combination use of oxygen bubbling not only increases the solubilization concentration of SWCNT but also suppresses reaggregation from occurring.

FIG. 17 shows comparison in particle diameter distribution of the SWCNT aggregated bodies in the SWCNT suspension liquid subjected to the streamer discharge treatment with oxygen gas bubbling. According thereto, the particle diameter distribution is decreased by about from $10^{-2}$ to $10^{-3}$ by the discharge treatment. The particle diameter of the SWCNT after subjecting to the discharge treatment is about 100 nm, which is larger than 15 nm, the bundle diameter of the SWCNT, but taking the high aspect ratio of the SWCNT into consideration, it is considered that the aggregated bodies of the SWCNT are raveled out by the underwater streamer discharge to be in a fiber form, and thus uniformly dispersed into individual bundle units.

FIG. 18 is the optical emission spectral distribution during the pulsed streamer discharge of the SWCNT suspension liquid. According to FIG. 18, the optical emission intensities of Hα radicals (656 nm), Hβ radicals (486 nm) and O radicals (777 nm) with oxygen gas bubbling are increased about twice the optical emission intensities of Hα radicals, Hβ radicals and O radicals without bubbling, and thus it is understood that the oxygen gas bubbling increased significantly not only O but also O radical and H radicals.

It is understood from the above that the bubbling not only exerts a physical agitation effect simply, but also contributes to chemical reaction. Specifically, it is considered that in the area along the channel of discharge, not only minute bubbles formed by discharge but also minute bubbles formed by bubbling are present. In the minute bubbles, the mean free path of electrons in the gas is larger than that in the liquid to form high energy electrons, and collision of the electrons generates radicals, for example, H radicals and OH radicals, from $H_2O$ (i.e., $H_2O \rightarrow$ H radical+OH radical). The amount of radicals varies depending on the species of the bubbling gas. According to Non-patent Document 4, in the case where the bubbling gas is oxygen, OH radicals are formed in a significantly large amount, and in the case where the bubbling gas is argon, H radicals and O radicals are formed largely, but the generation amount of OH radicals is small. While described later with respect to FIG. 20 and FIGS. 22(a), (b) and (c), argon gas bubbling exerts the most excellent function on solubilization of SWCNT. This shows that H radicals and O radicals exert significant function on solubilization in the case using argon. In other words, the case using argon shows that the gas species (or the solubility of the gas, in fact) influences on solubilization upon bubbling, and radicals generated with gas having a large solubility exert large contribution to bonding of OH groups.

In the case using oxygen gas, it is considered that the major factor of solubilization is that the underwater pulsed streamer discharge directly generates OH radicals, and the OH radicals are bonded to the surface of SWCNT or SWCNH to form OH groups. Furthermore, it is also considered that O radicals and $O_3$ generated through discharge oxidize the surface of SWCNT or SWCNH to attain surface modification, and H radicals generated through discharge are reacted with the O radical and $O_3$ adsorbed on the surface of SWCNT or SWCNH to form OH groups, which exerts secondary contribution to solubilization. Accordingly, ozone ($O_3$) gas may be bubbled.

In this point of view, in the case where the bubbling gas is an inert gas, such as argon gas and the like, in other words, in the case of gas with a small generation amount of OH radicals, H radicals and O radicals are formed to oxidize the surface of SWCNT or SWCNH with the O radicals, and H radicals generated through discharge are reacted with the O radicals adsorbed on the surface to form OH groups. The gas does not exert influence on the electrodes and the like owing to the inert nature thereof. The case using the air can also be understood from the aforementioned mechanism since the air contains oxygen and inert nitrogen gas. FIG. 19(a) is a photograph showing the single wall carbon nanotube suspension liquid after subjecting to the pulsed streamer discharge treatment with argon gas bubbling in Example 2 of the invention, and FIG. 19(b) is a photograph showing the single wall carbon nanotube suspension liquid after subjecting to the pulsed streamer discharge treatment without bubbling in Example 2 of the invention. According to FIGS. 19(a) and (b), it is understood that the highest suspension state is obtained and maintained by bubbling argon, which is an inert gas. The concentration of the SWCNT suspension liquid is 100 μg/mL, the flow rate of argon gas is 100 mL/min, and the treating time (discharge time) is 10 minutes.

FIG. 20 shows comparison in influence on the absorbance of the SWCNT suspension liquid upon bubbling argon gas as inert gas or nitrogen gas, i.e., the gas dependency of the solubilization efficiency. For comparison, the absorbances in the case without bubbling and the case with oxygen gas bubbling are also shown. The absorbances are measured on a suspension liquid of SWCNT (519308-250MG, produced by Aldrich, Inc.) with the plate electrode 4 of 15 mm×40 mm and the gap length g of 12 mm, and quantitated by normalizing the peak absorbances after lapsing 5 days from the treatment with the value obtained without gas bubbling as an index. According thereto, it is understood that the effect of gas bubbling is larger in the order of argon, nitrogen and oxygen. In the case where argon gas bubbling is used in combination, particularly, the absorbance is increased, i.e., the amount of solubilized SWCNT is increased, 3 times or more as compared to the case without bubbling.

FIGS. 21(a), (b) and (c) show states of the SWCNT suspension liquid after the underwater streamer discharge treatment, in which FIG. 21(a) shows the state of the SWCNT suspension liquid after subjecting to the underwater streamer discharge treatment without gas bubbling, FIG. 21(b) shows the state after performing the underwater streamer discharge treatment with nitrogen gas bubbling, and FIG. 21(c) shows the state after performing the underwater streamer discharge treatment with argon gas bubbling. The effectiveness of argon gas bubbling can be immediately understood by visual observation. Accordingly, it is understood that the solubilization of SWCNT by the underwater streamer discharge can be improved in efficiency by performing gas bubbling with oxygen or an inert gas, such as argon, nitrogen and the like. It has been described above that the same can be applied to the air since the air is a mixed gas of oxygen and nitrogen. In summary, it is considered that gas bubbling with any of these species of gas increases the amount of radicals generated through the underwater streamer discharge to accelerate modification of the surface of SWCNT. The same can be applied to SWCNH and the like. The state of generation of radicals has been described with reference to optical emission spectra shown in FIG. 18, and, for example, in the case where the radicals are derived from the solvent, and the underwater streamer discharge is performed with oxygen bubbling, the optical emission intensities of Hα radicals (656 nm) and O radicals (777 nm) are increased 1.6 times and 1.7 times, respectively. The optical emission intensities of Hβ radicals (486 nm) and O radicals (844 nm) are also increased 1.5 times and 1.2 times, respectively.

FIGS. 22(a) and (b) shows the optical emission intensities of the Hα and O radicals with gas bubbling of oxygen, nitrogen and argon normalized with the optical emission intensity without gas bubbling as an index. Additionally, the optical emission intensities in the case where gas bubbling of these species of gas is performed for 1 minute, and then the underwater streamer discharge is performed without bubbling are also shown. In the later case, the optical emission intensity is decreased from the former case but is increased 1.5 times or more from the case without bubbling. The optical emission intensities are increased about 3 times at most in the case using argon, and are about from 2.2 to 2.5 times for nitrogen and about 1.6 times for oxygen. In FIGS. 22(a) and (b), the width expressed with an error bar in each of the peaks of optical emission intensities means the fluctuation width on measurement. Accordingly, gas bubbling of argon is the most effective for generating Hα radicals and O radicals, and gas bubbling of nitrogen and gas bubbling of oxygen are effective in this order. The solubilization efficiency shown in FIG. 20 is higher by gas bubbling of argon, nitrogen and oxygen in this order, and thus this shows that the radicals generated by gas bubbling are closely involved in solubilization of SWCNT.

Since the amount of O radicals is increased, or the amount of H radicals is increased, with an inert gas as shown in FIGS. 22(a) and (b), it is considered that the gas atoms fed for bubbling is not the direct source of the radicals. Furthermore, since the optical emission intensities are increased in the case where the underwater streamer discharge with gas bubbling of these species of gas is performed for 1 minute, and then the underwater streamer discharge is performed without bubbling, as shown in FIGS. 22(a) and (b), it is understood that the physical action of bubbling is not exerted after lapsing 1 minute, and the gas dissolved in water by gas bubbling accelerates the generation of radicals. The fact that the solubility of argon in 1 cm$^3$ of water is 0.035 cm$^3$ (20° C.), the solubility of oxygen in 1 cm$^3$ of water is 0.031 cm$^3$ (20° C.), and the solubility of nitrogen in 1 cm$^3$ of water is 0.016 cm$^3$ (20° C.) strongly suggests participation of the solubility of the gas. Assuming that radicals generated by gas having a high solubility greatly contribute to bonding of OH groups, there is such a possibility in that the extent of solubilization is determined by the combination of the solubility and the reaction process of bonding of OH groups because oxygen generates OH radicals mainly, and an inert gas, such as argon, nitrogen and the like, generates H radicals and O radicals mainly. It can be at least said that the effectiveness of argon gas bubbling is significantly large.

As having been described, in the solubilizing method of Example 2, the streamer discharge is performed with bubbling gas in the suspension liquid, and thus an insoluble carbon nanomaterial, such as SWCNT, SWCNH and the like, can be easily solubilized in a hydrophilic solvent. The dispersibility of the carbon nanomaterial obtained by the method is maintained stably for a prolonged period of time. The solubilization can be attained by the method without structural deterioration of the carbon nanomaterial, and only the dispersibility can be improved. The combination use of the streamer discharge and the bubbling not only improves the solubilization concentration of the carbon nanomaterial, but also suppresses subsequent reaggregation from occurring, whereby the dispersibility can be maintained for a prolonged period of time.

Furthermore, since only the gas bubbling is performed in addition to the streamer discharge, a simple apparatus may be used as compared to an apparatus that performs high voltage pulsed arc discharge or an apparatus that performs streamer discharge in gas and dispersion treatment separately, whereby the solubilizing treatment can be performed at low cost, and the treatment can be easily controlled.

Example 3

The method for solubilizing a carbon nanomaterial according to Example 3 of the invention will be described. Example 3 describes the case where single wall carbon nanotubes (SWCNT) and single wall carbon nanohorns (SWCNH) are solubilized, as similar to Example 2. However, the method can be applied to not only SWCNT and SWCNH, but also carbon nanomaterials, such as MWCNT and the like.

In Example 2, bubbling is performed for solubilizing an insoluble carbon nanomaterial, such as SWCNT, SWCNH and the like. In Example 3, on the other hand, underwater streamer discharge is performed in a solvent that is liable to generate OH radicals, for generating OH groups on the surface of SWCNT and SWCNH.

Specifically, in Example 3, underwater pulsed streamer discharge is performed in an aqueous solution of hydrogen peroxide ($H_2O_2$). In this case, the area along the channel of discharge becomes rich in $H_2O_2$. A strong ultraviolet ray is radiated in this state from plasma of the pulsed streamer discharge to activate $H_2O_2$ in the area along the channel of discharge, thereby decomposing $H_2O_2$ to OH radicals by inducing the reaction, $H_2O_2 + h\nu \rightarrow 2$ OH radicals. The OH radicals are bonded directly to the surface of SWCNT and SWCNH to form OH groups. FIG. 23(a) is a photograph showing a suspension liquid of single wall carbon nanotubes after subjecting to the pulsed streamer discharge treatment in an aqueous solution of hydrogen peroxide in Example 3 of the invention, and FIG. 23(b) is a photograph showing a suspension liquid of single wall carbon nanotubes before subjecting to the pulsed streamer discharge treatment in Example 3 of the invention. According to FIGS. 23(a) and (b), it is understood that a suspension state is obtained and maintained by performing the pulsed streamer discharge in a hydrogen peroxide aqueous solution. Gas bubbling is not performed, the concentration of SWCNT in the suspension liquid is 100 μg/mL, the concentration of hydrogen peroxide is 30%, the flow rate is 100 mL/min, and the treating time (discharge time) is 10 minutes. OH groups can also be formed by using an aqueous solution of ozone gas $O_3$ (ozone water) as the suspension liquid.

In the solubilizing method of Example 3, the streamer discharge is performed in a hydrogen peroxide aqueous solution as the suspension liquid, and thus an insoluble carbon nanomaterial, such as SWCNT, SWCNH and the like, can be easily solubilized in a hydrophilic solvent. The dispersibility of the carbon nanomaterial obtained by the method is maintained stably for a prolonged period of time. The solubilization can be attained by the method without structural deterioration of the carbon nanomaterial, and only the dispersibility can be improved.

Furthermore, since only a hydrogen peroxide aqueous solution is used in addition to the streamer discharge, a simple apparatus may be used as compared to an apparatus that performs high voltage pulsed arc discharge or an apparatus that performs streamer discharge in gas and dispersion treatment separately, whereby the solubilizing treatment can be performed at low cost, and the treatment can be easily controlled.

INDUSTRIAL APPLICABILITY

The invention can be applied to a solubilizing method capable of dissolving a carbon nanomaterial in a hydrophilic solvent and maintaining the dispersibility thereof for a prolonged period of time.

BRIEF DESCRIPTION OF THE DRAWINGS

FIG. 4(a) is a photograph showing a suspension liquid before subjecting to the pulsed streamer discharge treatment in Example 1 of the invention, and FIG. 4(b) is a photograph showing a suspension liquid after subjecting to the pulsed streamer discharge treatment in Example 1 of the invention.

FIG. 13(a) is a photograph showing a suspension liquid after subjecting to the pulsed streamer discharge treatment with oxygen gas bubbling in Example 2 of the invention, FIG. 13(b) is a photograph showing a suspension liquid after subjecting to the pulsed streamer discharge treatment without gas bubbling in Example 2 of the invention, and FIG. 13(c) is a photograph showing a suspension liquid before subjecting to the pulsed streamer discharge treatment in Example 2 of the invention.

Figure 1:
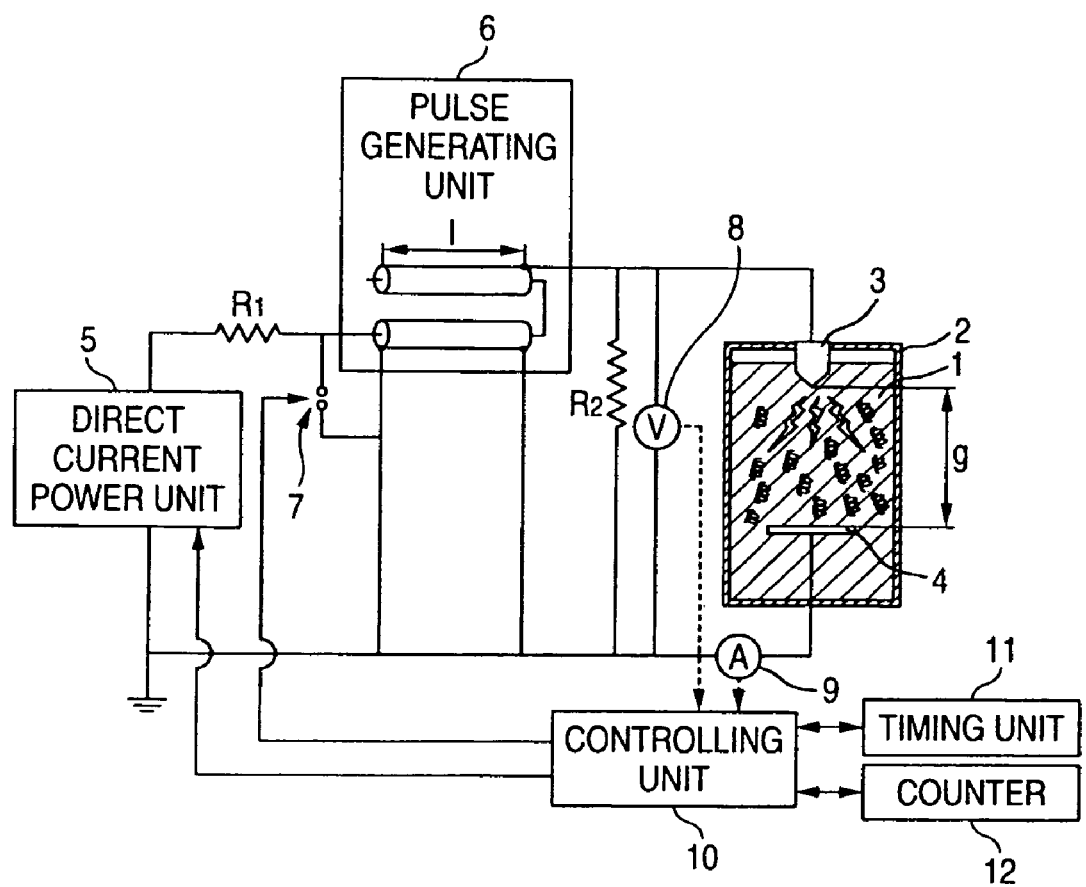
FIG. 1 is an explanatory diagram showing a solubilizing apparatus in Example 1 of the invention.
Figure 2:
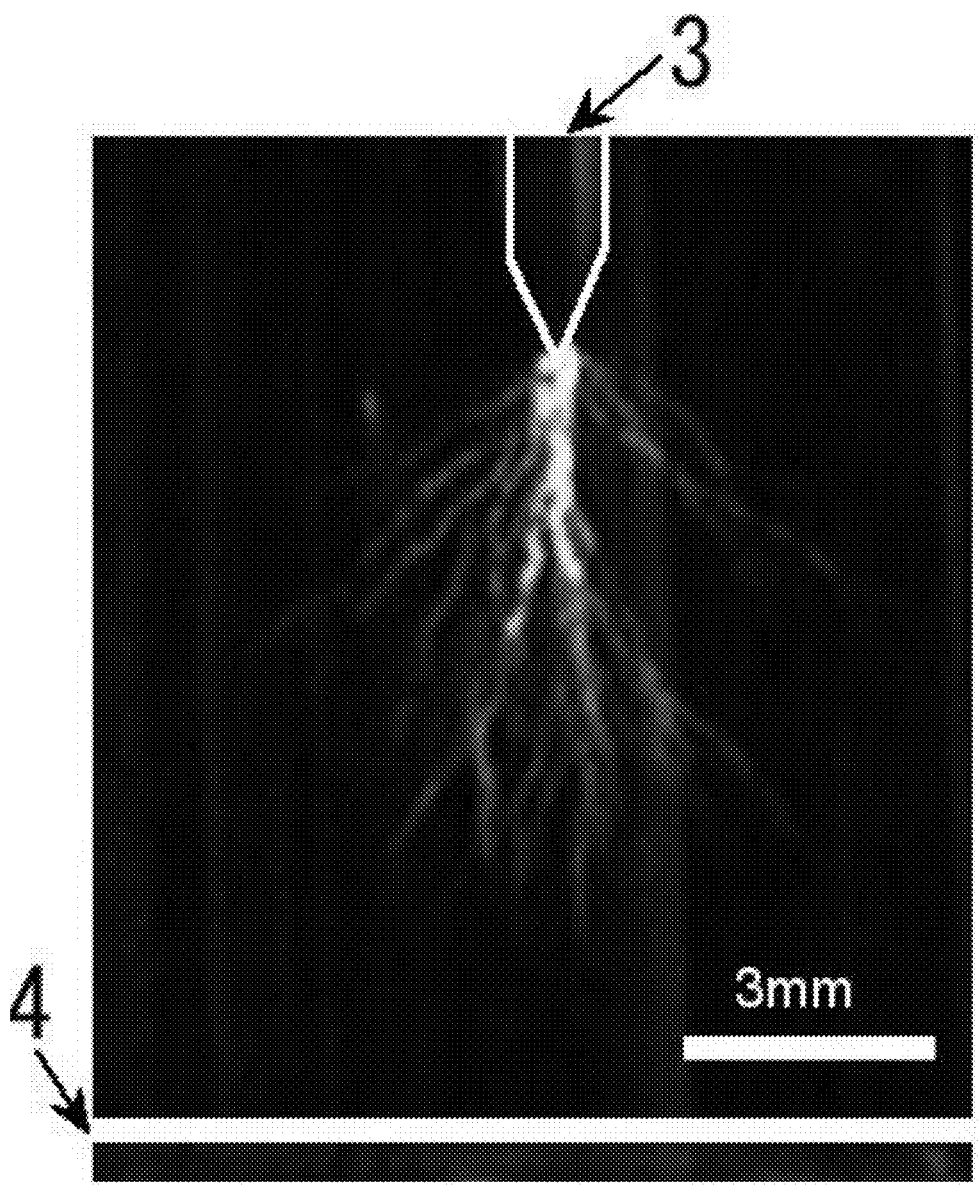
FIG. 2 is a photograph showing optical emission on pulsed streamer discharge in the invention.
Figure 3:
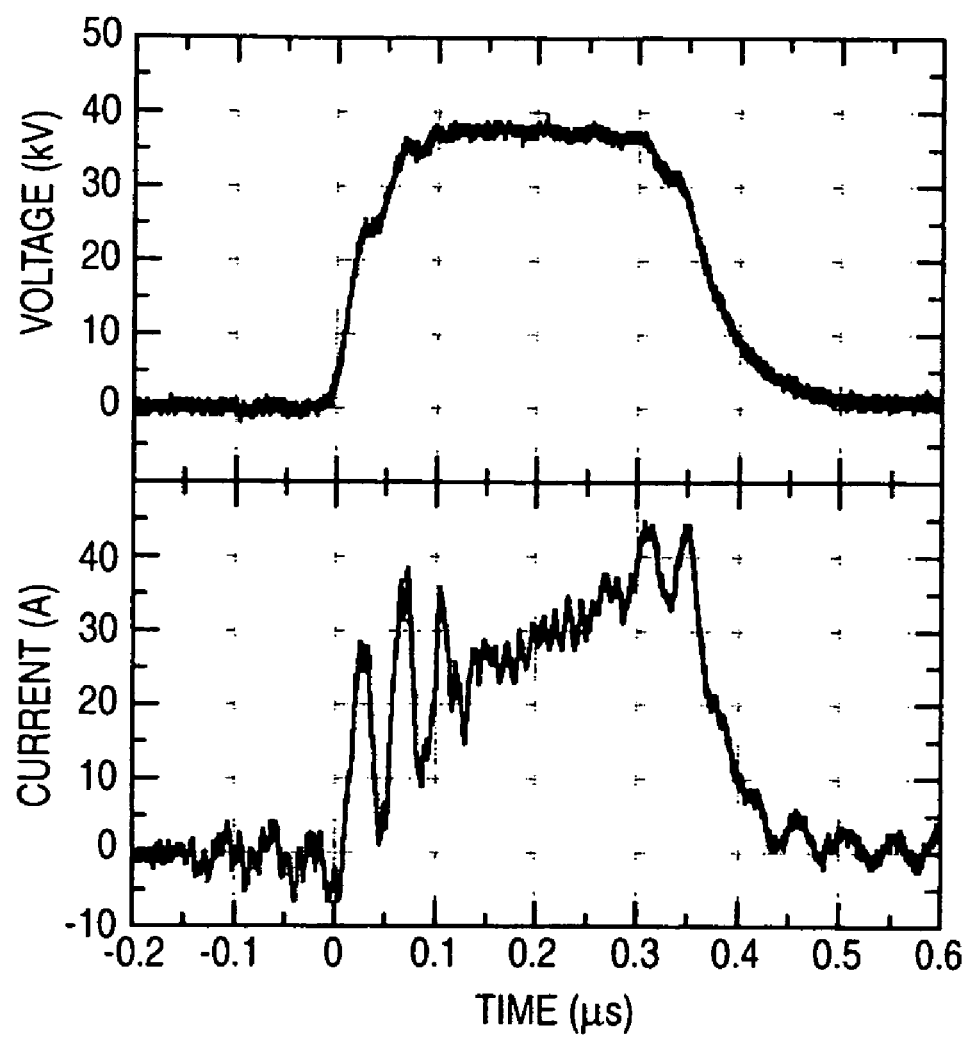
FIG. 3 is an explanatory diagram showing the waveforms of the output voltage and current of pulsed streamer discharge in Example 1 of the invention.
Figure 5A:
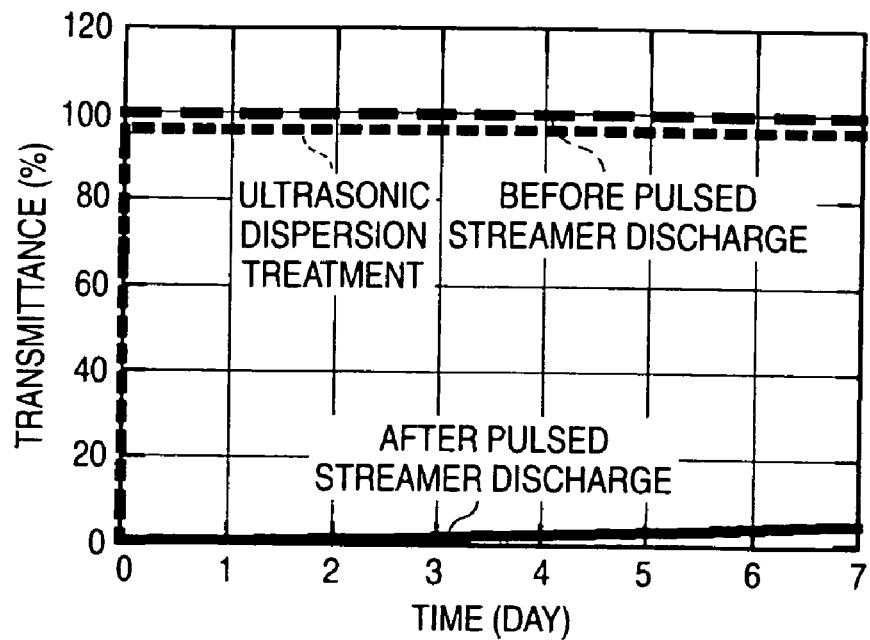
FIG. 5(a) is an explanatory diagram showing the transmittance before and after the pulsed streamer discharge treatment and that in the case where an ultrasonic dispersion treatment is performed.
Figure 5B:
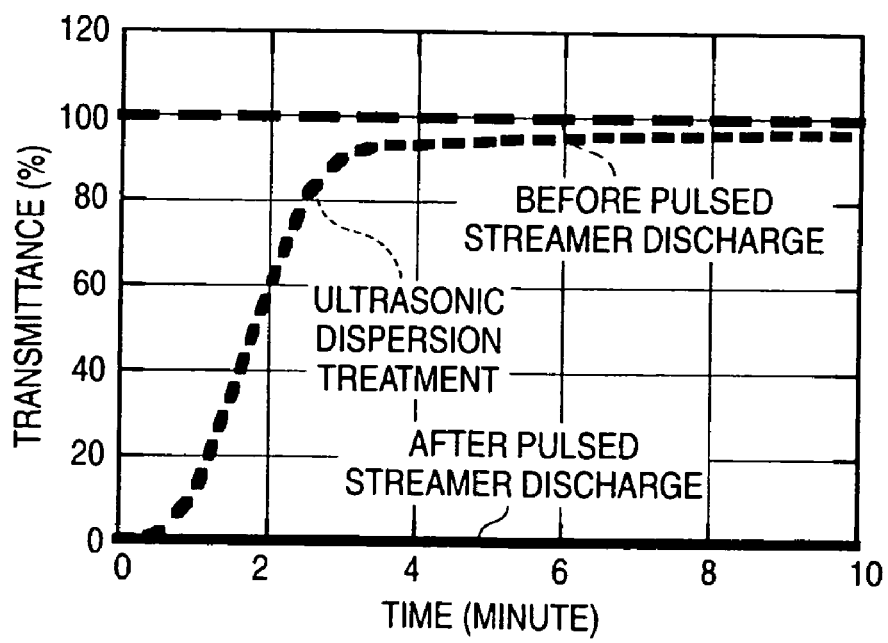
FIG. 5(b) is an enlarged view of a part of FIG. 5(a) surrounded with the chain line.
Figure 6A:
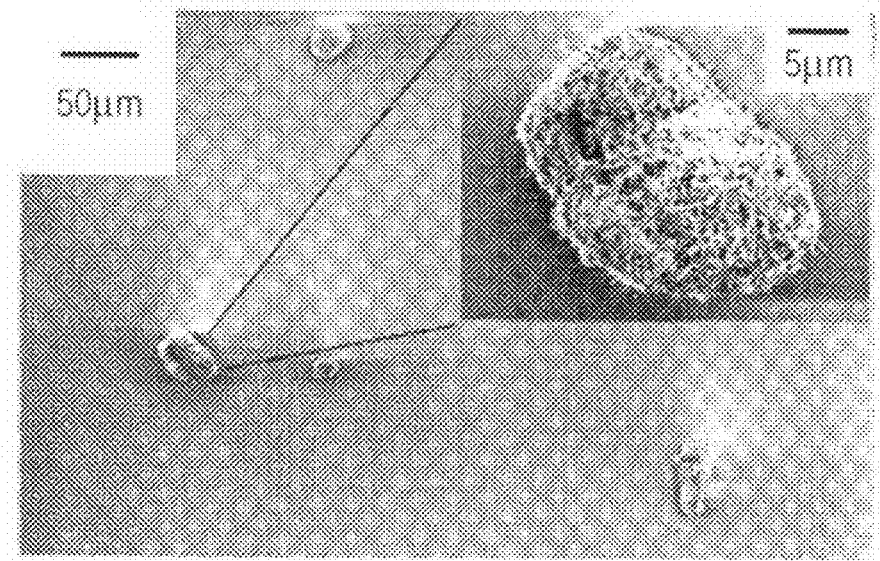
FIG. 6(a) is an SEM photograph showing multi-wall carbon nanotubes before subjecting to the pulsed streamer discharge treatment in Example 1 of the invention.
Figure 6B:
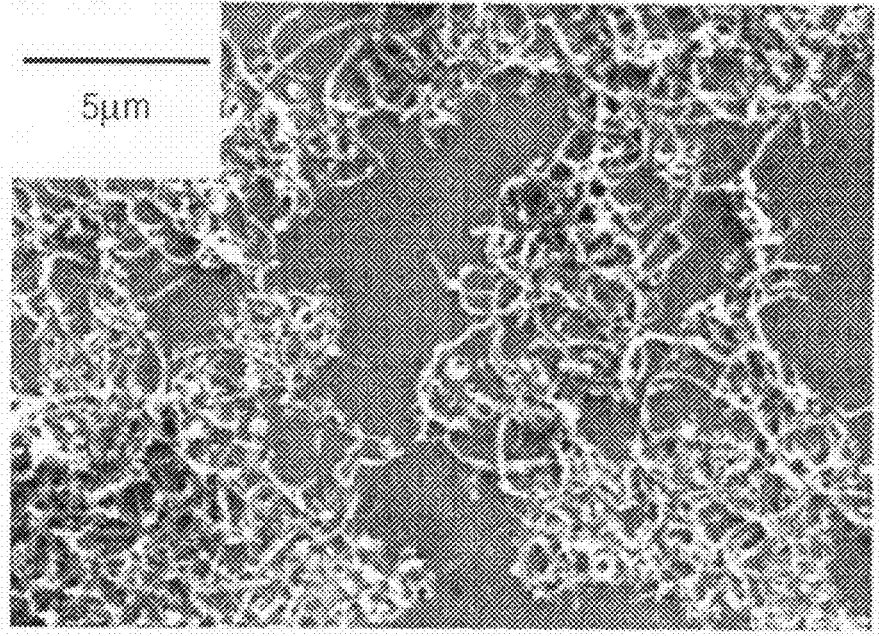
FIG. 6(b) is an SEM photograph showing multi-wall nanotubes after subjecting to the pulsed streamer discharge treatment in Example 1 of the invention.
Figure 7:
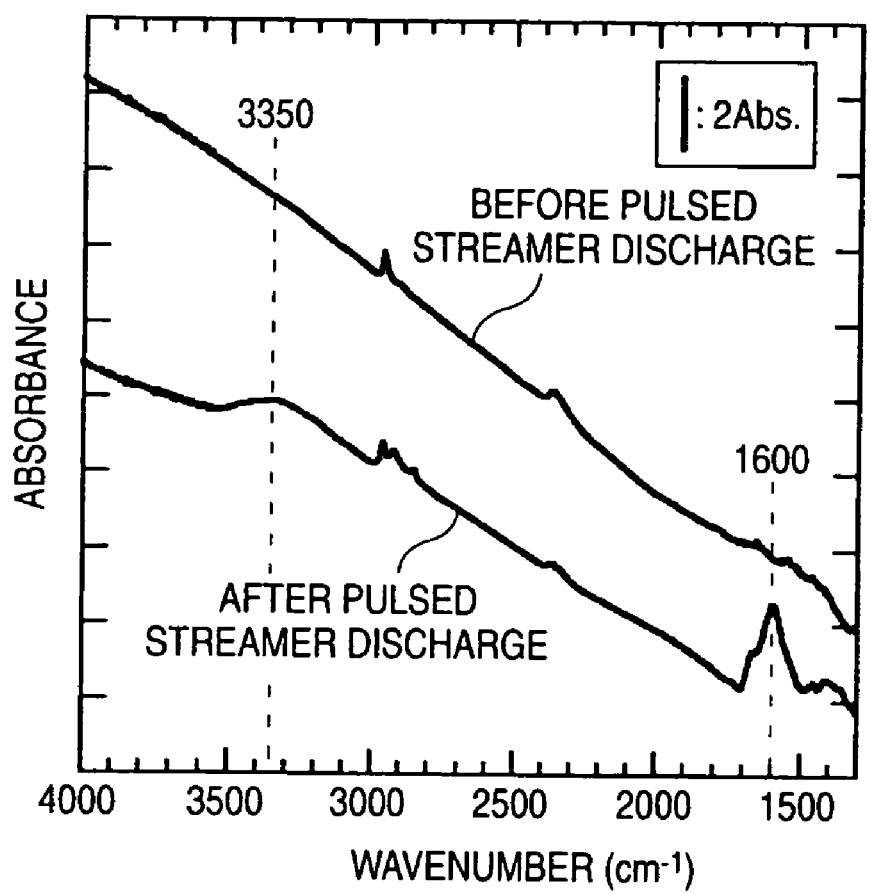
FIG. 7 is an explanatory diagram showing the FTIR measurement results of the multi-wall carbon nanotubes before and after the pulsed streamer discharge treatment in Example 1 of the invention.
Figure 8:
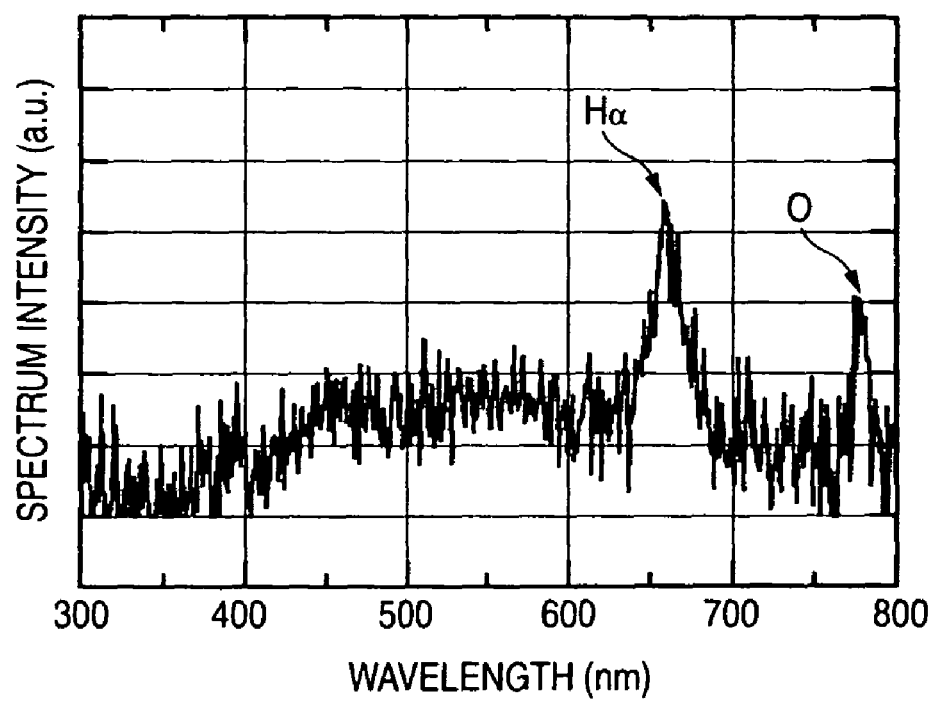
FIG. 8 is a diagram showing measurement of a optical emission spectrum from the pulsed streamer discharge in Example 1 of the invention.
Figure 9A:
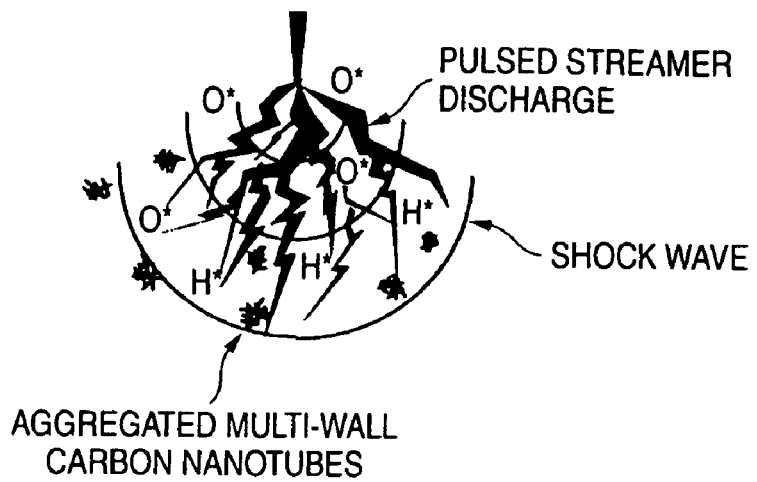
FIG. 9(a) is an explanatory view showing dispersion of the multi-wall carbon nanotubes after subjecting to the pulsed streamer discharge treatment in Example 1 of the invention.
Figure 9B:
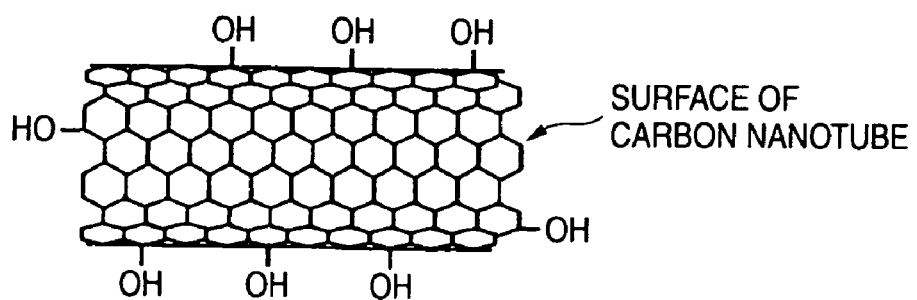
FIG. 9(b) is an enlarged explanatory view showing the multi-wall carbon nanotubes in FIG. 9(a).
Figure 10:
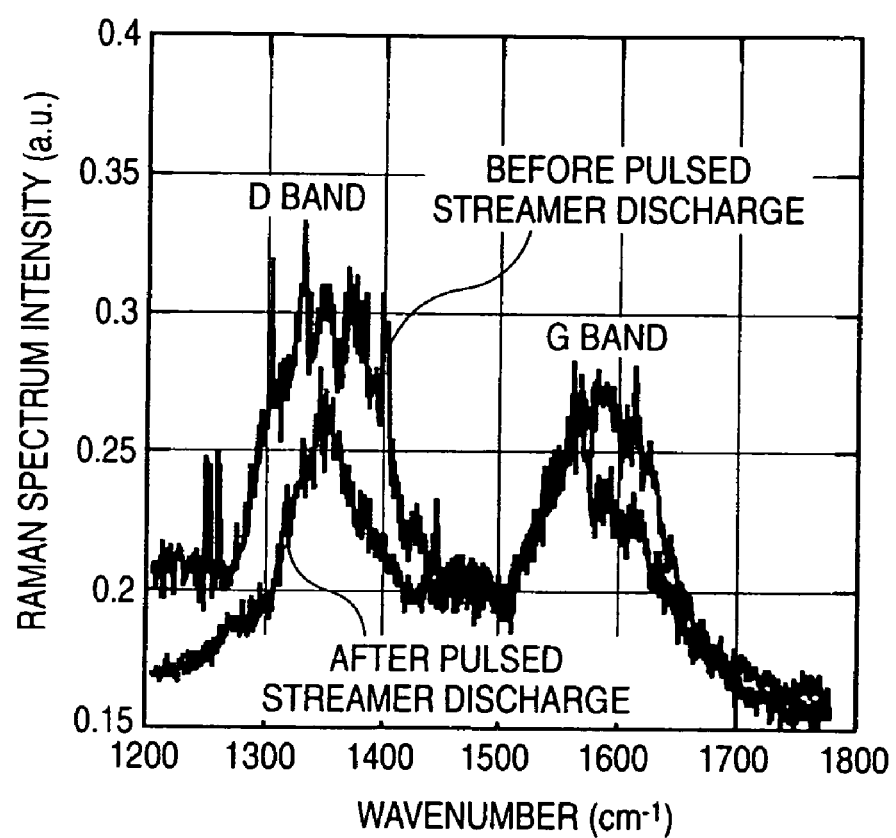
FIG. 10 is a diagram showing Raman spectral measurement of the multi-wall carbon nanotubes after subjecting to the pulsed streamer discharge treatment in Example 1 of the invention.
Figure 11:
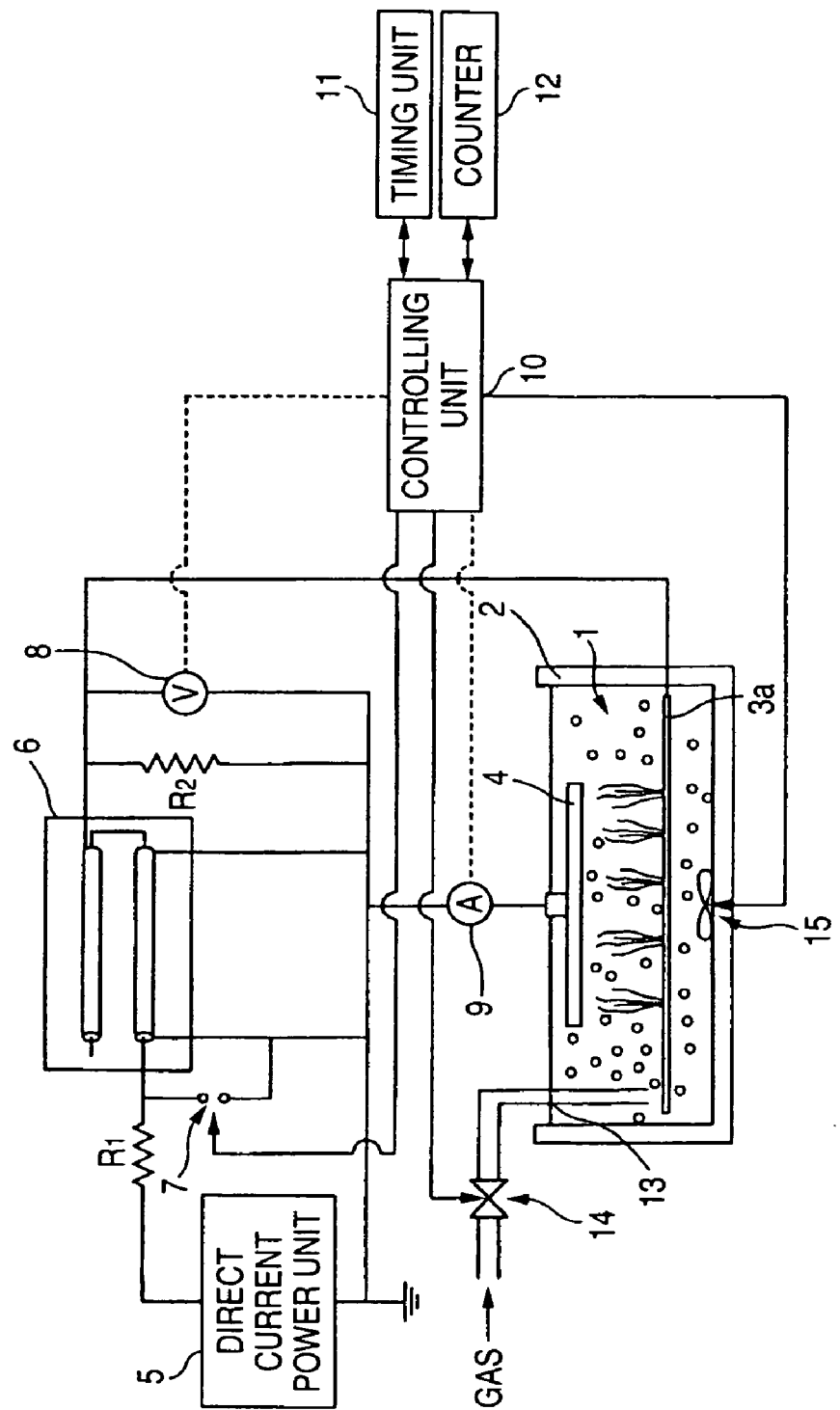
FIG. 11 is an explanatory diagram showing a solubilizing apparatus in Example 2 of the invention.
Figure 12:
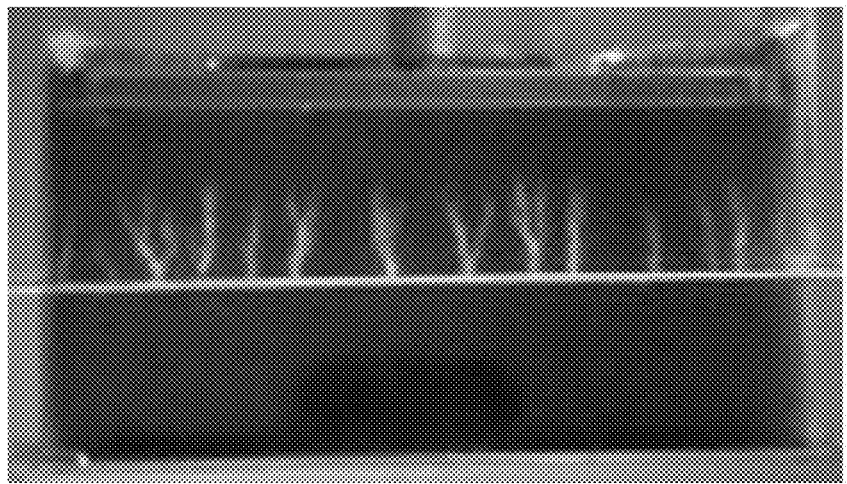
FIG. 12 is a photograph showing optical emission on pulsed streamer discharge in Example 2 of the invention.
Figure 14:
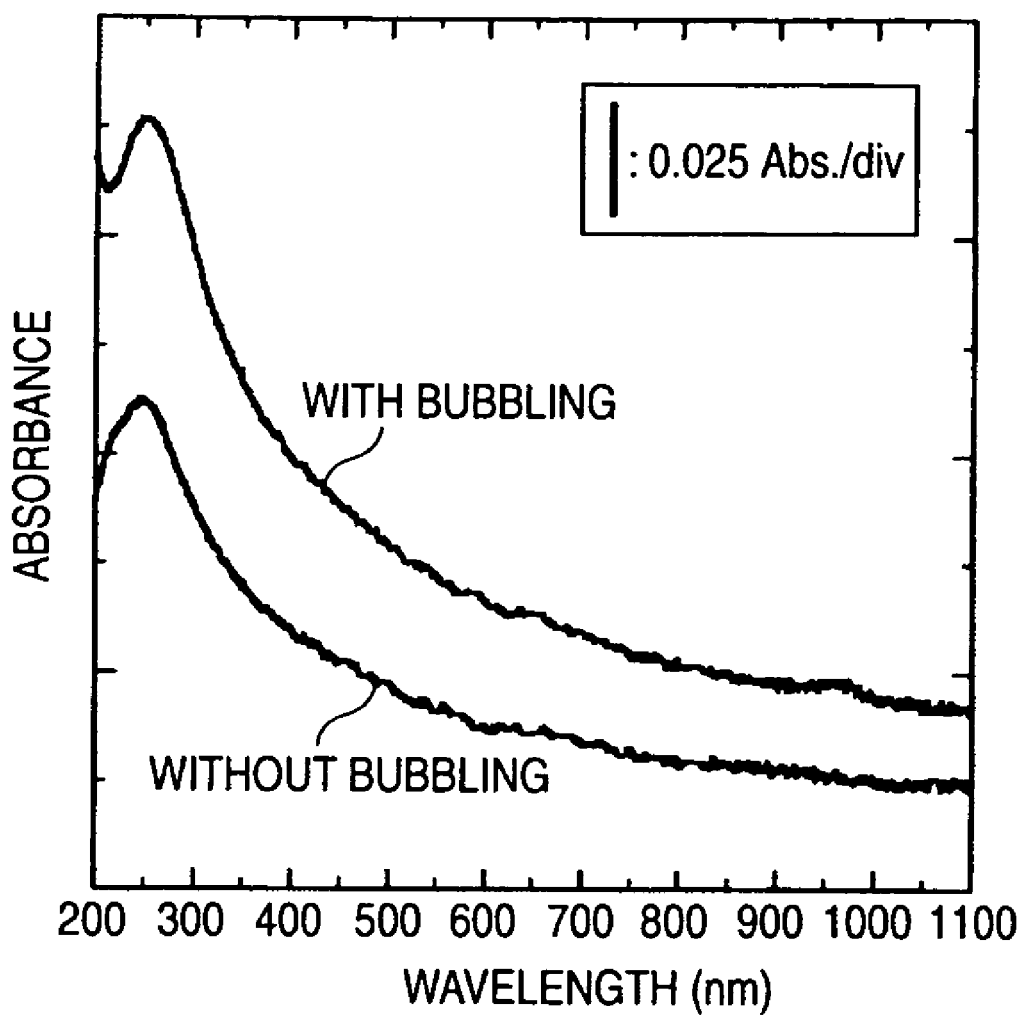
FIG. 14 is an explanatory diagram showing spectral distributions of the absorbance in the presence and absence of bubbling in Example 2 of the invention.
Figure 15A:
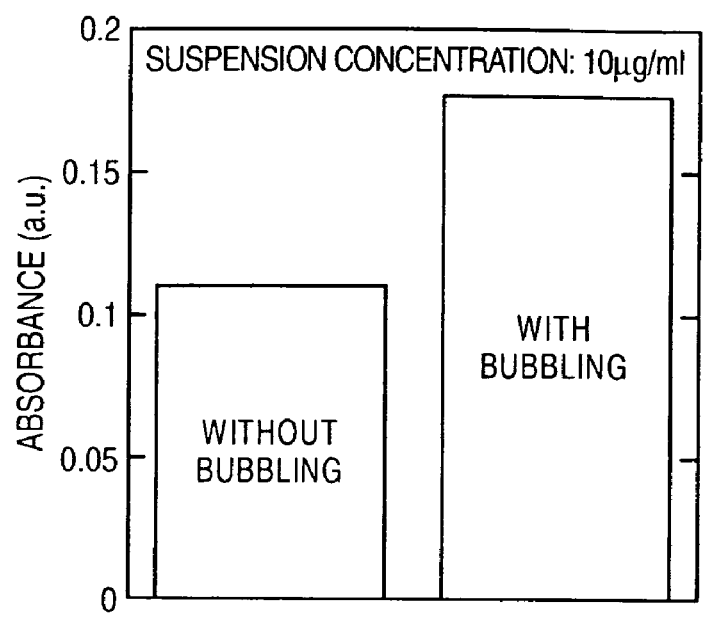
FIG. 15(a) is an explanatory diagram showing the absorbance of the SWCNT suspension liquid compared for the presence and absence of bubbling in Example 2 of the invention.
Figure 15B:
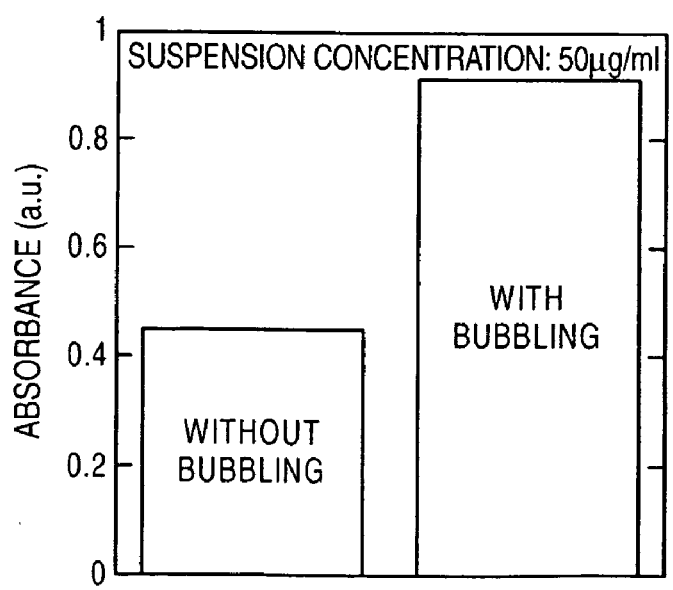
FIG. 15(b) is an explanatory diagram showing the absorbance of the SWCNH suspension liquid compared for the presence and absence of bubbling in Example 2 of the invention.
Figure 16:
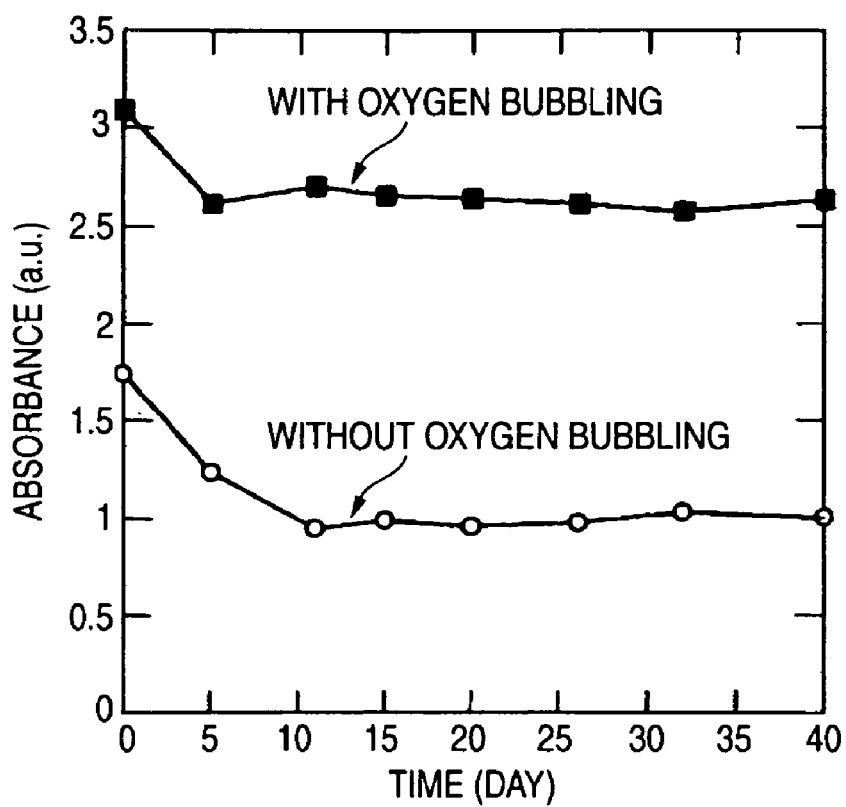
FIG. 16 is a diagram showing the time-lapse change of the absorbance of the SWCNT suspension liquid after subjecting to the underwater streamer discharge treatment in Example 2 of the invention.
Figure 17:
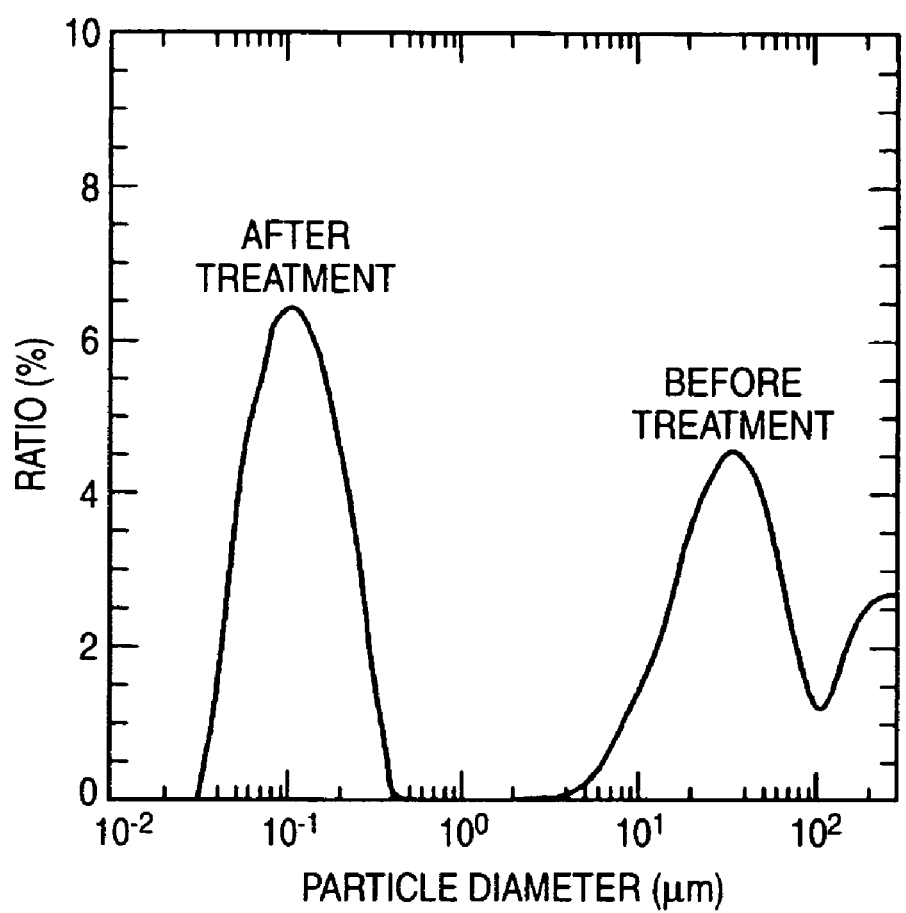
FIG. 17 is a diagram showing the particle diameter distribution of the SWCNT suspension liquid subjected to the streamer discharge treatment with oxygen gas bubbling in Example 2 of the invention.
Figure 18:
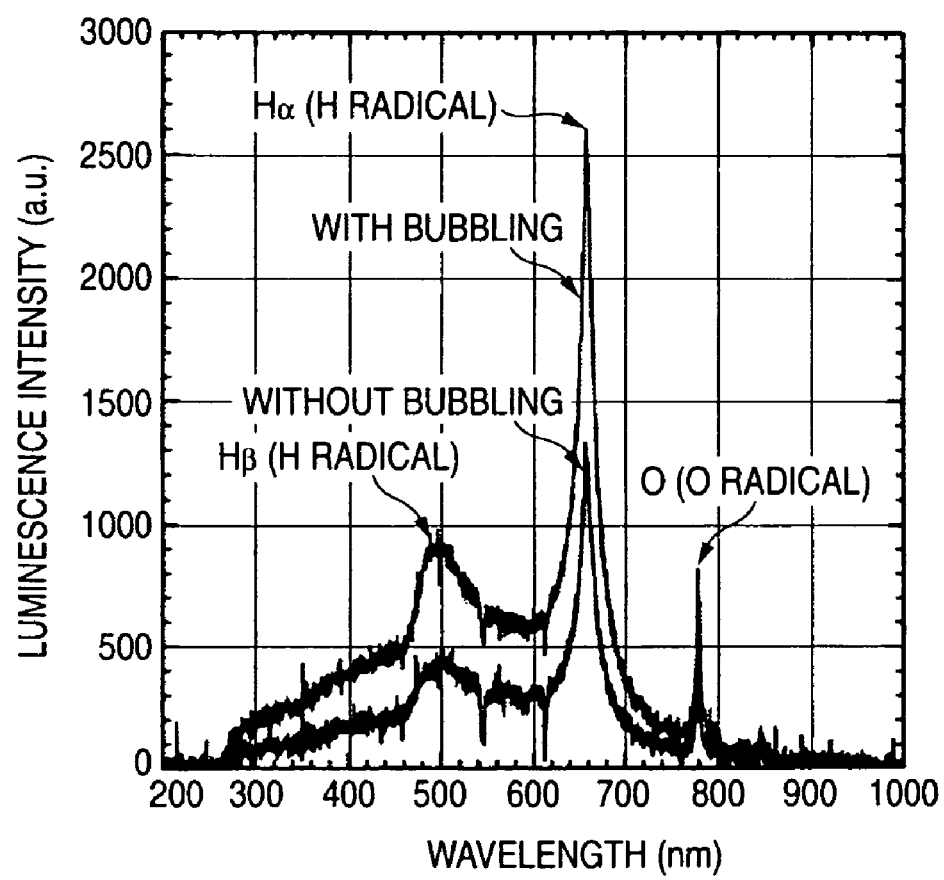
FIG. 18 is a diagram showing the optical emission spectral distribution during the pulsed streamer discharge of the single wall nanotube suspension liquid in Example 2 of the invention.
Figure 19A:
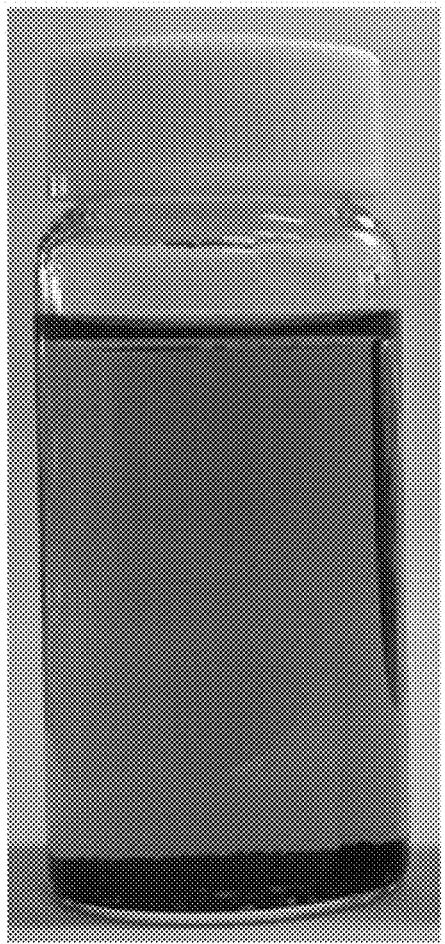
FIG. 19(a) is a photograph showing a single wall carbon nanotube suspension liquid after subjecting to the pulsed streamer discharge treatment with argon gas bubbling in Example 2 of the invention.
Figure 19B:
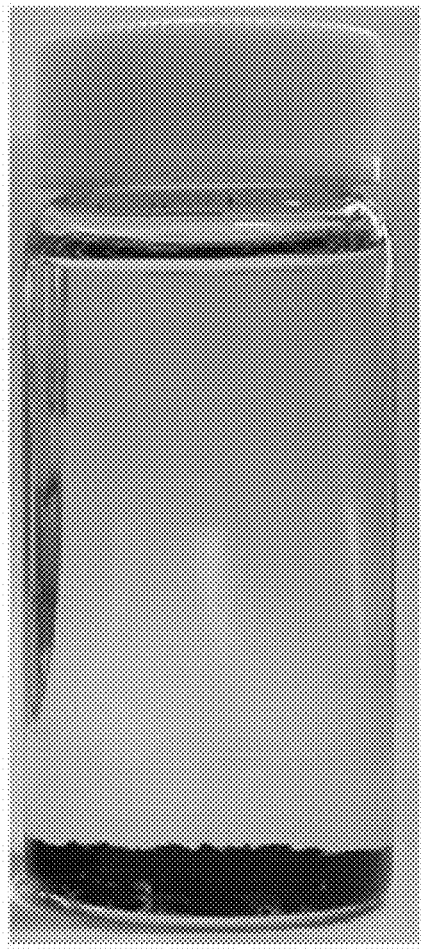
FIG. 19(b) is a photograph showing a single wall carbon nanotube suspension liquid after subjecting to the pulsed streamer discharge treatment without bubbling in Example 2 of the invention.
Figure 20:
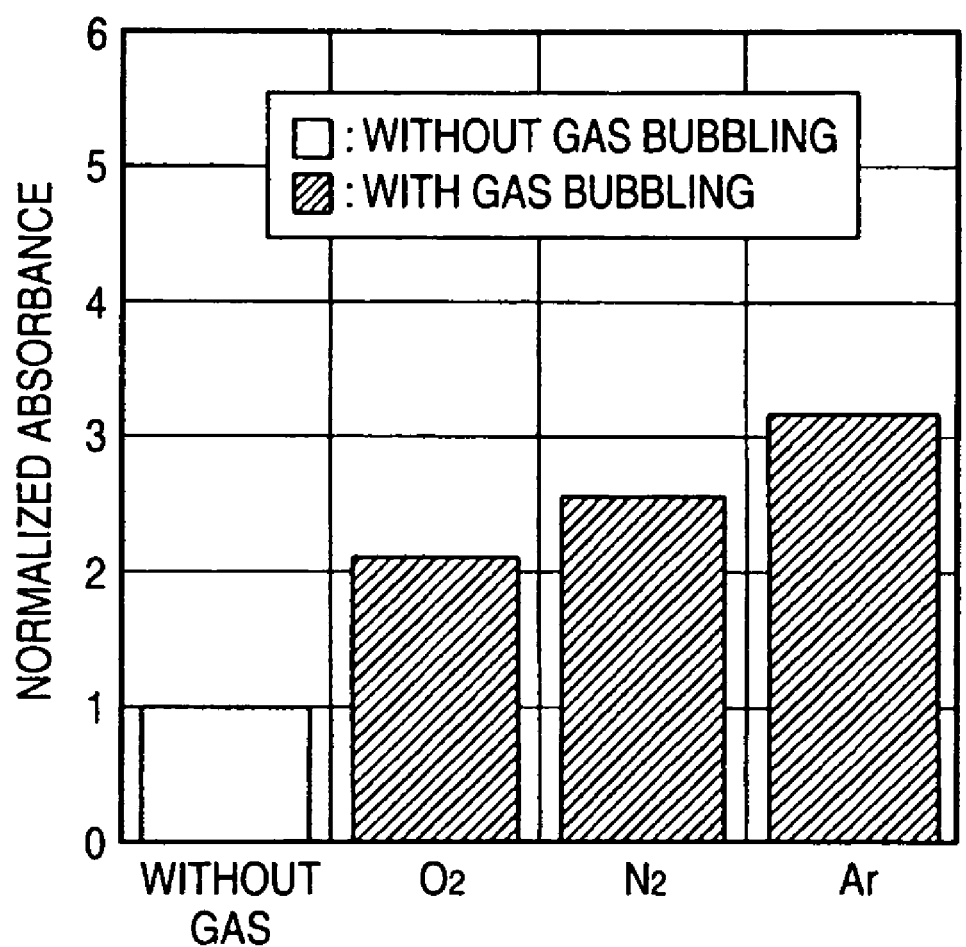
FIG. 20 is a diagram showing comparison in influence on the absorbance of the SWCNT suspension liquid upon performing gas bubbling in Example 2 of the invention.
Figures 21A, 21B, 21C:
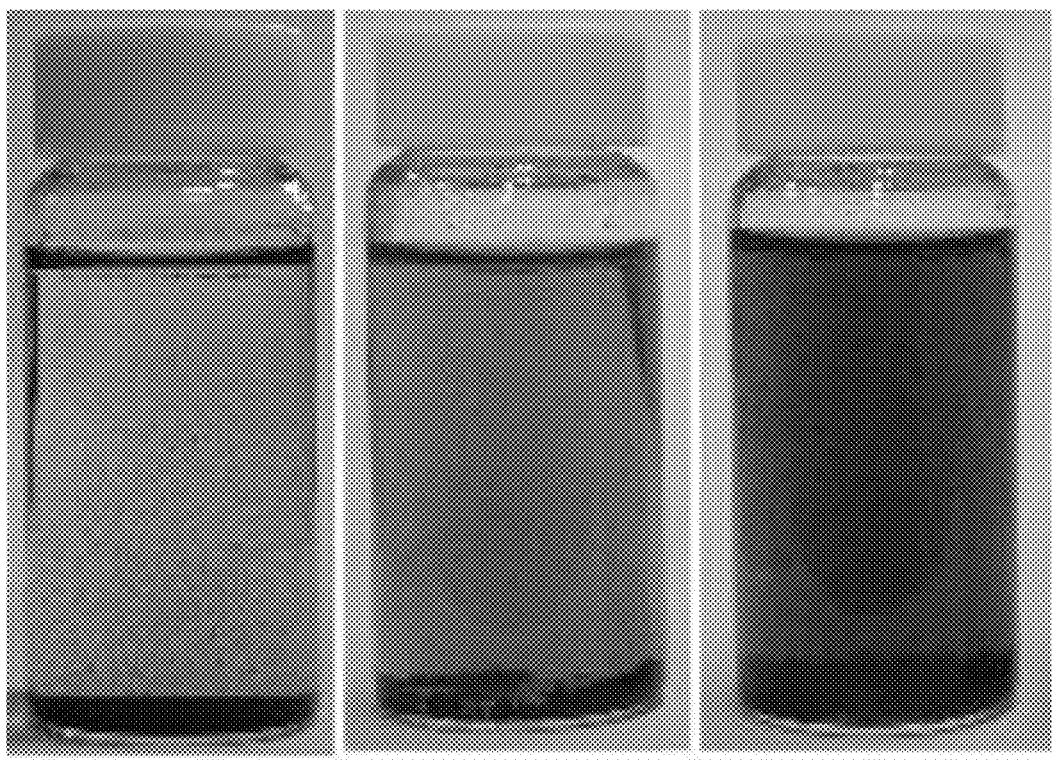
FIG. 21(a) is a photograph showing a SWCNT suspension liquid after subjecting to the underwater streamer discharge treatment without gas bubbling.
FIG. 21(b) is a photograph showing the state after performing the discharge treatment with nitrogen gas bubbling.
FIG. 21(c) is a photograph showing the state after performing the discharge treatment with argon gas bubbling.
Figure 22A:
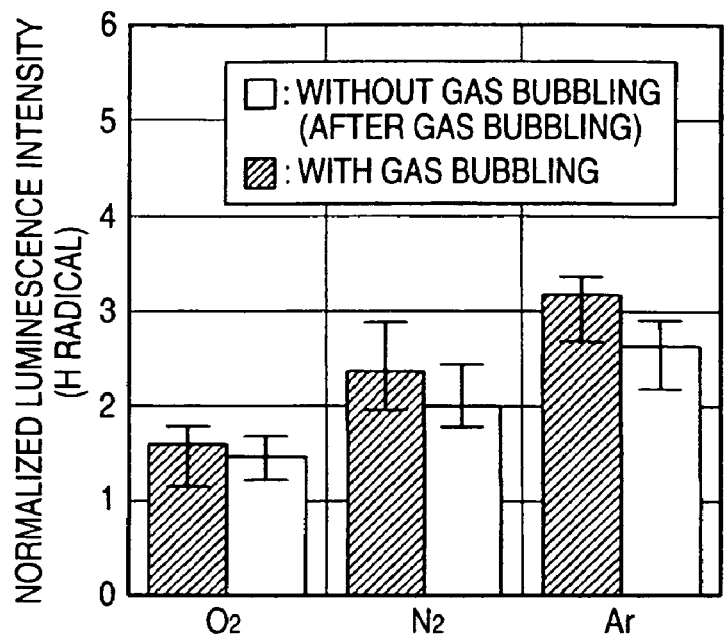
FIG. 22(a) is a diagram showing comparison in normalized optical emission intensity of Hα in the cases where gas bubbling of oxygen, nitrogen and argon is performed.
Figure 22B:
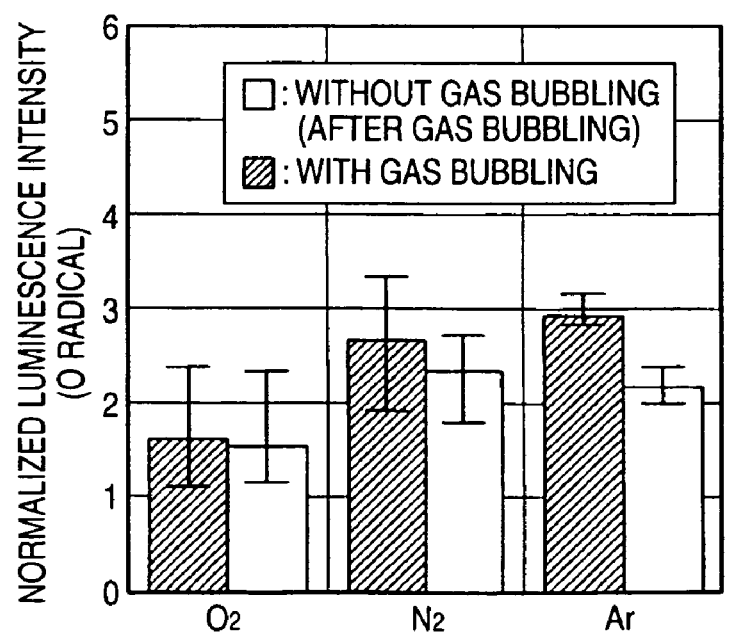
FIG. 22(b) is a diagram showing comparison in normalized optical emission intensity of O radicals in the cases where gas bubbling of oxygen, nitrogen and argon is performed.
Figure 23A:
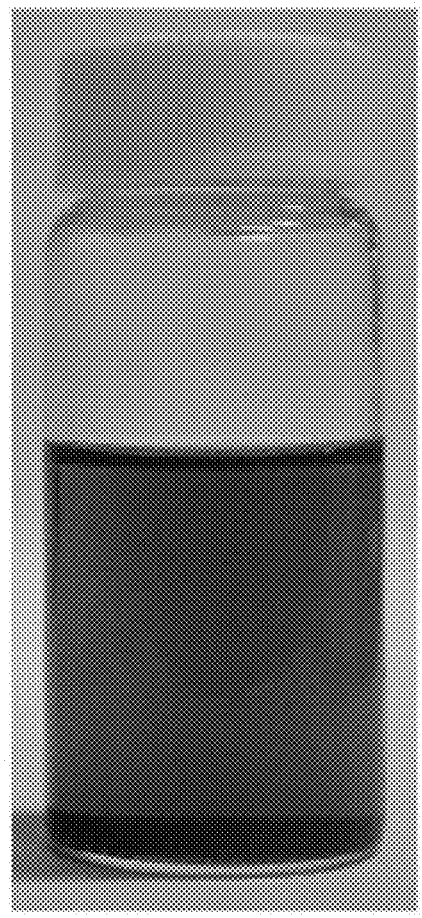
FIG. 23 (a) is a photograph showing a suspension liquid of single wall carbon nanotubes after subjecting to the pulsed streamer discharge treatment in an aqueous solution of hydrogen peroxide in Example 3 of the invention.
FIG. 23(b) is a photograph showing a suspension liquid of single wall carbon nanotubes before subjecting to the pulsed streamer discharge treatment in Example 3 of the invention.
Figure 23B:
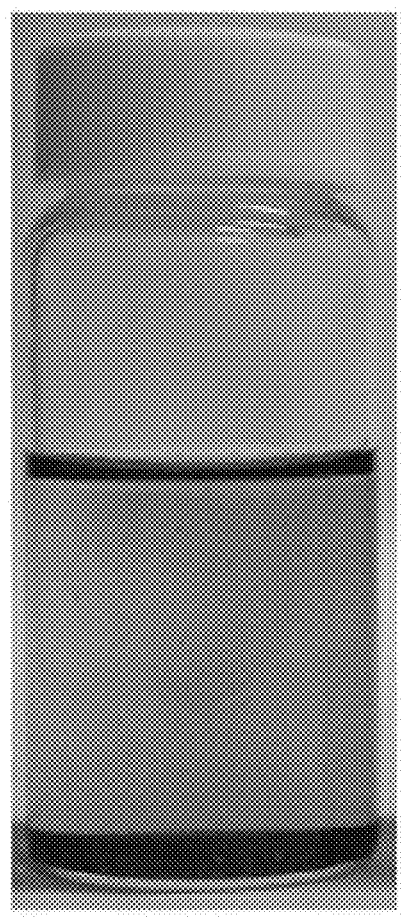

DESCRIPTION OF THE REFERENCE NUMERALS AND SIGNS 1 suspension liquid
2 discharge chamber
3 needle electrode
3a wire electrode
4 plate electrode
5 direct current power source
6 pulse generating unit
7 gap switch
8 voltage measuring unit
9 current measuring unit
10 controlling unit
11 timing unit
12 counter
13 gas ejection path
14 flow control valve
15 stirrer

The invention claimed is:

1. A method of solubilizing a carbon nanomaterial characterized by comprising: mixing a carbon nanomaterial in a hydrophilic solvent; performing streamer discharge repeatedly in the hydrophilic solvent to form in the solvent radicals derived from the solvent capable of bonding OH groups on a surface of the carbon nanomaterial; making the carbon nanomaterial hydrophilic with the radicals to solubilize in the solvent; and dispersing the carbon nanomaterial in the hydrophilic solvent stably, wherein said performing streamer discharge provides nonequilibrium plasma that increases only an electron temperature to a high level, thereby solubilizing the carbon nanomaterial without inducing structural deterioration of the carbon nanomaterial.

2. The method for solubilizing a carbon nanomaterial according to claim 1, characterized in that the streamer discharge is pulsed streamer discharge.

3. The method for solubilizing a carbon nanomaterial according to claim 1, characterized in that the streamer discharge forms mainly an H radical and an O radical in the hydrophilic solvent, and forms OH groups on the carbon nanomaterial in the hydrophilic solvent.

4. The method for solubilizing a carbon nanomaterial according to claim 1, characterized in that the streamer discharge forms mainly an OH radical in the hydrophilic solvent, and forms OH groups on the carbon nanomaterial in the hydrophilic solvent.

5. The method for solubilizing a carbon nanomaterial according to claim 1, characterized in that the carbon nanomaterial is one of multi-wall carbon nanotubes, single wall carbon nanotubes, a fullerene and carbon nanocapsules.

6. The method for solubilizing a carbon nanomaterial according to claim 1, characterized in that the streamer discharge is performed by applying a pulse voltage with a pulse width of 1 μs or less at a prescribed frequency to electrodes.

7. A method of solubilizing a carbon nanomaterial characterized by comprising: mixing a carbon nanomaterial in a hydrophilic solvent; performing streamer discharge repeatedly in the hydrophilic solvent while bubbling gas in the hydrophilic solvent to form in the solvent radicals derived from the solvent capable of bonding OH groups on a surface of the carbon nanomaterial; making the carbon nanomaterial hydrophilic with the radicals to solubilize in the solvent; and dispersing the carbon nanomaterial in the hydrophilic solvent stably, wherein said performing streamer discharge provides nonequilibrium plasma that increases only an electron temperature to a high level, thereby solubilizing the carbon nanomaterial without inducing structural deterioration of the carbon nanomaterial.

8. The method for solubilizing a carbon nanomaterial according to claim 7, characterized in that the gas is one of oxygen, ozone and an inert gas.

9. A method of solubilizing a carbon nanomaterial characterized by comprising: mixing a carbon nanomaterial in a hydrophilic solvent having hydrogen peroxide or ozone dissolved therein; performing streamer discharge repeatedly in the hydrophilic solvent to form in the solvent radicals derived from the solvent capable of bonding OH groups on a surface of the carbon nanomaterial; making the carbon nanomaterial hydrophilic with the radicals to solubilize in the solvent; and dispersing the carbon nanomaterial in the hydrophilic solvent stably, wherein said performing streamer discharge provides nonequilibrium plasma that increases only an electron temperature to a high level, thereby solubilizing the carbon nanomaterial without inducing structural deterioration of the carbon nanomaterial.

* * * * *